United States Patent
Ding et al.

(10) Patent No.: US 11,804,196 B2
(45) Date of Patent: Oct. 31, 2023

(54) DISPLAY SUBSTRATE INCLUDING SHIFT CIRCUITS CONFIGURED TO PROVIDE GATE DRIVING SIGNALS IN A SKIPPING MODE, METHOD FOR DRIVING SAME AND DISPLAY DEVICE

(71) Applicants: Beijing BOE Display Technology Co., Ltd., Beijing (CN); BOE Technology Group Co., Ltd., Beijing (CN)

(72) Inventors: Tengfei Ding, Beijing (CN); Yang Wang, Beijing (CN); Shijun Wang, Beijing (CN); Bo Feng, Beijing (CN); Jun Fan, Beijing (CN); Wenkai Mu, Beijing (CN); Yi Liu, Beijing (CN); Xinlan Yang, Beijing (CN); Li Tian, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 127 days.

(21) Appl. No.: 17/429,919

(22) PCT Filed: Oct. 23, 2020

(86) PCT No.: PCT/CN2020/123261
§ 371 (c)(1),
(2) Date: Aug. 10, 2021

(87) PCT Pub. No.: WO2022/082735
PCT Pub. Date: Apr. 28, 2022

(65) Prior Publication Data
US 2022/0310030 A1     Sep. 29, 2022

(51) Int. Cl.
*G09G 3/36* (2006.01)
*G02F 1/1362* (2006.01)

(52) U.S. Cl.
CPC ......... *G09G 3/3674* (2013.01); *G09G 3/3677* (2013.01); *G02F 1/1362* (2013.01);
(Continued)

(58) Field of Classification Search
CPC ............... G09G 3/3674; G09G 3/3677; G09G 2300/0408; G09G 2300/0452;
(Continued)

(56) References Cited

U.S. PATENT DOCUMENTS

2007/0001953 A1* 1/2007 Jang ..................... G09G 3/3677
345/88
2008/0012819 A1* 1/2008 Lee ...................... G09G 3/3677
345/100

(Continued)

FOREIGN PATENT DOCUMENTS

| CN | 202948235 U | 5/2013 |
| CN | 105632391 A | 6/2016 |

(Continued)

*Primary Examiner* — Adam J Snyder
(74) *Attorney, Agent, or Firm* — IPRO, PLLC

(57) ABSTRACT

Provided is a display substrate. The display substrate includes a base substrate, a plurality of gate lines, a plurality of data lines, and a plurality of rows of pixels arranged in an
(Continued)

array on the base substrate, and a plurality of shift circuits disposed on the base substrate, wherein in a plurality of pixels connected to each shift circuit, the respective pixels sharing the same data line have the same color, and each shift circuit is connected to one turn-on signal terminal.

20 Claims, 10 Drawing Sheets

(52) U.S. Cl.
CPC ............... *G09G 2300/0408* (2013.01); *G09G 2300/0426* (2013.01); *G09G 2300/0452* (2013.01); *G09G 2310/0202* (2013.01); *G09G 2310/0286* (2013.01); *G09G 2310/08* (2013.01); *G09G 2330/023* (2013.01)

(58) Field of Classification Search
CPC ... G09G 2310/0202; G09G 2310/0286; G09G 2310/08; G09G 2330/023; G09G 2300/0426; G02F 1/1362
See application file for complete search history.

(56) References Cited

U.S. PATENT DOCUMENTS

| | | | |
|---|---|---|---|
| 2012/0212401 A1* | 8/2012 | Bae | G09G 3/3677 |
| | | | 345/87 |
| 2015/0379919 A1* | 12/2015 | Wen | G09G 3/20 |
| | | | 345/215 |
| 2017/0039918 A1 | 2/2017 | Tsao et al. | |
| 2020/0251038 A1* | 8/2020 | Chien | G09G 3/3614 |
| 2020/0251072 A1* | 8/2020 | Chen | G09G 3/3614 |
| 2021/0287615 A1 | 9/2021 | Cherng et al. | |

FOREIGN PATENT DOCUMENTS

| | | |
|---|---|---|
| CN | 106448527 A | 2/2017 |
| CN | 10333632 A | 10/2019 |
| CN | 110308599 A | 10/2019 |
| CN | 110879500 A | 3/2020 |
| CN | 111123598 A | 5/2020 |
| CN | 111192546 A | 5/2020 |
| CN | 111508409 A | 8/2020 |
| CN | 111508446 A | 8/2020 |
| KR | 20180009188 A | 1/2018 |

* cited by examiner

DISPLAY SUBSTRATE INCLUDING SHIFT CIRCUITS CONFIGURED TO PROVIDE GATE DRIVING SIGNALS IN A SKIPPING MODE, METHOD FOR DRIVING SAME AND DISPLAY DEVICE

CROSS-REFERENCE TO RELATED APPLICATION

This application is a 371 of PCT Application No. PCT/CN2020/123261, filed on Oct. 23, 2020, the disclosure of which is herein incorporated by reference in its entirety.

TECHNICAL FIELD

The present disclosure relates to the field of display technologies, and in particular, relates to a display substrate, a method for driving the same and a display device.

BACKGROUND

Liquid crystal display (LCD) devices are widely applied in the display field for the advantages such as high resolution, light weight and low power consumption.

SUMMARY

The present disclosure provides a display substrate, a method for driving the same and a display device. The technical solutions are as below.

According to an aspect, a display substrate is provided. The display substrate includes: a base substrate, a plurality of gate lines, a plurality of data lines and a plurality of rows of pixels arranged in an array on the base substrate, wherein each row of the pixels includes a plurality of pixel groups, each of the pixel groups includes two adjacent pixels of different colors, and the two adjacent pixels are connected to different gate lines and a same data line; and a plurality of shift circuits disposed on the base substrate, wherein each of the shift circuits is connected to one turn-on signal terminal and at least two gate lines of the plurality of gate lines, and each of the shift circuits is configured to provide a gate driving signal to each gate line connected thereto in response to a turn-on signal provided by the turn-on signal terminal, wherein in a plurality of pixels connected to each of the shift circuits, colors of pixels connected to a same data line are the same.

Optionally, each of the shift circuits includes at least four shift register units, each of the shift register units is connected to a gate line, and the at least four shift register units in each of the shift circuits are capable of being divided into two shift register groups, wherein each of the shift register groups includes a plurality of cascaded shift register units, and one shift register unit in each of the shift register groups is connected to the turn-on signal terminal.

Optionally, each shift register group includes a plurality of shift register sub-groups, each of the shift register sub-groups includes two adjacent cascaded shift register units, one of which is connected to an $i^{th}$ gate line and the other of which is connected to an $(i+s)^{th}$ gate line, wherein the $i^{th}$ gate line and the $(i+s)^{th}$ gate line are adjacent to each other, i being a positive integer and s being 1 or 2.

Optionally, a number d of clock signal terminals connected to the plurality of shift circuits in the display substrate is an integral multiple of 4.

Optionally, the number d of the clock signal terminals connected to the plurality of shift circuits in the display substrate is 16.

Optionally, the plurality of shift circuits includes four shift circuits including a first shift circuit, a second shift circuit, a third shift circuit, and a fourth shift circuit, wherein the first shift circuit and the second shift circuit are disposed at one side of the plurality of rows of pixels, and the third shift circuit and the fourth shift circuit are disposed at the other side of the plurality of rows of pixels.

Optionally, a $(2n-1)^{th}$ shift register sub-group at the one side of the plurality of rows of pixels belongs to the first shift circuit, and a $2n^{th}$ shift register sub-group at the one side of the plurality of rows of pixels belongs to the second shift circuit, n being a positive integer; and a $(2n-1)^{th}$ shift register sub-group at the other side of the plurality of rows of pixels belongs to the third shift circuit, and a $2n^{th}$ shift register sub-group at the other side of the plurality of rows of pixels belongs to the fourth shift circuit.

Optionally, a $(4n-3)^{th}$ shift register sub-group at the one side of the plurality of rows of pixels belongs to one shift register group in the first shift circuit, and a $(4n-1)^{th}$ shift register sub-group at the one side of the plurality of rows of pixels belongs to the other shift register group in the first shift circuit;

a $(4n-2)^{th}$ shift register sub-group at the one side of the plurality of rows of pixels belongs to one shift register group in the second shift circuit, and a $4n^{th}$ shift register sub-group at the one side of the plurality of rows of pixels belongs to the other shift register group in the second shift circuit;

a $(4n-3)^{th}$ shift register sub-group at the other side of the plurality of rows of pixels belongs to one shift register group in the third shift circuit, and a $(4n-1)^{th}$ shift register sub-group at the other side of the plurality of rows of pixels belongs to the other shift register group in the third shift circuit; and a $(4n-2)^{th}$ shift register sub-group at the other side of the plurality of rows of pixels belongs to one shift register group in the fourth shift circuit, and a $4n^{th}$ shift register sub-group at the other side of the plurality of rows of pixels belongs to the other shift register group in the fourth shift circuit.

Optionally, s is 2, and the shift register unit connected to the $i^{th}$ gate line is an $i^{th}$ shift register unit; wherein a first shift register unit and a third shift register unit are cascade-connected to each other, the first shift register unit is configured to provide a carry signal to the third shift register unit, and the third shift register unit is configured to provide a reset signal to the first shift register unit;

the third shift register unit and a $(1+d)^{th}$ shift register unit are further cascade-connected to each other, the third shift register unit is configured to provide a carry signal to the $(1+d)^{th}$ shift register unit, and the $(1+d)^{th}$ shift register unit is configured to provide a reset signal to the third shift register unit;

a fifth shift register unit and a seventh shift register unit are cascade-connected to each other, the fifth shift register unit is configured to provide a carry signal to the seventh shift register unit, and the seventh shift register unit is configured to provide a reset signal to the fifth shift register unit;

the seventh shift register unit and a $(5+d)^{th}$ shift register unit are further cascade-connected to each other, the seventh shift register unit is configured to provide a carry signal to the $(5+d)^{th}$ shift register unit, and the $(5+d)^{th}$ shift register unit is configured to provide a reset signal to the seventh shift register unit;

a ninth shift register unit and an eleventh shift register unit are cascade-connected to each other, the ninth shift register unit is configured to provide a carry signal to the eleventh shift register unit, and the eleventh shift register unit is configured to provide a reset signal to the ninth shift register unit;

the eleventh shift register unit and a $(9+d)^{th}$ shift register unit are further cascade-connected to each other, the eleventh shift register unit is configured to provide a carry signal to the $(9+d)^{th}$ shift register unit, and the $(9+d)^{th}$ shift register unit is configured to provide a reset signal to the eleventh shift register unit;

a thirteenth shift register unit and a fifteenth shift register unit are cascade-connected to each other, the thirteenth shift register unit is configured to provide a carry signal to the fifteenth shift register unit, and the fifteenth shift register unit is configured to provide a reset signal to the thirteenth shift register unit;

the fifteenth shift register unit and a $(13+d)^{th}$ shift register unit are further cascade-connected to each other, the fifteenth shift register unit is configured to provide a carry signal to the $(13+d)^{th}$ shift register unit, and the $(13+d)^{th}$ shift register unit is configured to provide a reset signal to the fifteenth shift register unit;

a second shift register unit and a fourth shift register unit are cascade-connected to each other, the second shift register unit is configured to provide a carry signal to the fourth shift register unit, and the fourth shift register unit is configured to provide a reset signal to the second shift register unit;

the fourth shift register unit and a $(2+d)^{th}$ shift register unit are further cascade-connected to each other, the fourth shift register unit is configured to provide a carry signal to the $(2+d)^{th}$ shift register unit, and the $(2+d)^{th}$ shift register unit is configured to provide a reset signal to the fourth shift register unit;

a sixth shift register unit and an eighth shift register unit are cascade-connected to each other, the sixth shift register unit is configured to provide a carry signal to the eighth shift register unit, and the eighth shift register unit is configured to provide a reset signal to the sixth shift register unit;

the eighth shift register unit and a $(6+d)^{th}$ shift register unit are further cascade-connected to each other, the eighth shift register unit is configured to provide a carry signal to the $(6+d)^{th}$ shift register unit, and the $(6+d)^{th}$ shift register unit is configured to provide a reset signal to the eighth shift register unit;

a tenth shift register unit and a twelfth shift register unit are cascade-connected to each other, the tenth shift register unit is configured to provide a carry signal to the twelfth shift register unit, and the twelfth shift register unit is configured to provide a reset signal to the tenth shift register unit;

the twelfth shift register unit and a $(10+d)^{th}$ shift register unit are further cascade-connected to each other, the twelfth shift register unit is configured to provide a carry signal to the $(10+d)^{th}$ shift register unit, and the $(10+d)^{th}$ shift register unit is configured to provide a reset signal to the twelfth shift register unit;

a fourteenth shift register unit and a sixteenth shift register unit are cascade-connected to each other, the fourteenth shift register unit is configured to provide a carry signal to the sixteenth shift register unit, and the sixteenth shift register unit is configured to provide a reset signal to the fourteenth shift register unit; and the sixteenth shift register unit and a $(14+d)^{th}$ shift register unit are further cascade-connected to each other, the sixteenth shift register unit is configured to provide a carry signal to the $(14+d)^{th}$ shift register unit, and the $(14+d)^{th}$ shift register unit is configured to provide a reset signal to the sixteenth shift register unit.

Optionally, s is 1, and the shift register unit connected to the $i^{th}$ gate line is an $i^{th}$ shift register unit;

a first shift register unit and a second shift register unit are cascade-connected to each other, the first shift register unit is configured to provide a carry signal to the second shift register unit, and the second shift register unit is configured to provide a reset signal to the first shift register unit;

the second shift register unit and a $(1+d)^{th}$ shift register unit are further cascade-connected to each other, the second shift register unit is configured to provide a carry signal to the $(1+d)^{th}$ shift register unit, and the $(1+d)^{th}$ shift register unit is configured to provide a reset signal to the second shift register unit;

a third shift register unit and a fourth shift register unit are cascade-connected to each other, the third shift register unit is configured to provide a carry signal to the fourth shift register unit, and the fourth shift register unit is configured to provide a reset signal to the third shift register unit;

the fourth shift register unit and a $(3+d)^{th}$ shift register unit are further cascade-connected to each other, the fourth shift register unit is configured to provide a carry signal to the $(3+d)^{th}$ shift register unit, and the $(3+d)^{th}$ shift register unit is configured to provide a reset signal to the fourth shift register unit;

a fifth shift register unit and a sixth shift register unit are cascade-connected to each other, the fifth shift register unit is configured to provide a carry signal to the sixth shift register unit, and the sixth shift register unit is configured to provide a reset signal to the fifth shift register unit;

the sixth shift register unit and a $(5+d)^{th}$ shift register unit are further cascade-connected to each other, the sixth shift register unit is configured to provide a carry signal to the $(5+d)^{th}$ shift register unit, and the $(5+d)^{th}$ shift register unit is configured to provide a reset signal to the sixth shift register unit;

a seventh shift register unit and an eighth shift register unit are cascade-connected to each other, the seventh shift register unit is configured to provide a carry signal to the eighth shift register unit, and the eighth shift register unit is configured to provide a reset signal to the seventh shift register unit;

the eighth shift register unit and a $(7+d)^{th}$ shift register unit are further cascade-connected to each other, the eighth shift register unit is configured to provide a carry signal to the $(7+d)^{th}$ shift register unit, and the $(7+d)^{th}$ shift register unit is configured to provide a reset signal to the eighth shift register unit;

a ninth shift register unit and a tenth shift register unit are cascade-connected to each other, the ninth shift register unit is configured to provide a carry signal to the tenth shift register unit, and the tenth shift register unit is configured to provide a reset signal to the ninth shift register unit;

the tenth shift register unit and a $(9+d)^{th}$ shift register unit are further cascade-connected to each other, the tenth shift register unit is configured to provide a carry signal to the $(9+d)^{th}$ shift register unit, and the $(9+d)^{th}$ shift register unit is configured to provide a reset signal to the tenth shift register unit;

an eleventh shift register unit and a twelfth shift register unit are cascade-connected to each other, the eleventh shift register unit is configured to provide a carry signal to the twelfth shift register unit, and the twelfth shift register unit is configured to provide a reset signal to the eleventh shift register unit;

the twelfth shift register unit and a $(11+d)^{th}$ shift register unit are further cascade-connected to each other, the twelfth shift register unit is configured to provide a carry signal to the $(11+d)^{th}$ shift register unit, and the $(11+d)^{th}$ shift register unit is configured to provide a reset signal to the twelfth shift register unit;

a thirteenth shift register unit and a fourteenth shift register unit are cascade-connected to each other, the thirteenth shift register unit is configured to provide a carry signal to the fourteenth shift register unit, and the fourteenth shift register unit is configured to provide a reset signal to the thirteenth shift register unit;

the fourteenth shift register unit and a $(13+d)^{th}$ shift register unit are further cascade-connected to each other, the fourteenth shift register unit is configured to provide a carry signal to the $(13+d)^{th}$ shift register unit, and the $(13+d)^{th}$ shift register unit is configured to provide a reset signal to the fourteenth shift register unit;

a fifteenth shift register unit and a sixteenth shift register unit are cascade-connected to each other, the fifteenth shift register unit is configured to provide a carry signal to the sixteenth shift register unit, and the sixteenth shift register unit is configured to provide a reset signal to the fifteenth shift register unit; and the sixteenth shift register unit and a $(15+d)^{th}$ shift register unit are further cascade-connected to each other, the sixteenth shift register unit is configured to provide a carry signal to the $(15+d)^{th}$ shift register unit, and the $(15+d)^{th}$ shift register unit is configured to provide a reset signal to the sixteenth shift register unit.

Optionally, the display substrate includes a first turn-on signal terminal, a second turn-on signal terminal, a third turn-on signal terminal and a fourth turn-on signal terminal;

in the first shift circuit, a first shift register unit in a first shift register sub-group and a first shift register unit in a second shift register sub-group are connected to the first turn-on signal terminal;

in the second shift circuit, a first shift register unit in a first shift register sub-group and a first shift register unit in a second shift register sub-group are connected to the third turn-on signal terminal;

in the third shift circuit, a first shift register unit in a first shift register sub-group and a first shift register unit in a second shift register sub-group are connected to the second turn-on signal terminal; and in the fourth shift circuit, a first shift register unit in a first shift register sub-group and a first shift register unit in a second shift register sub-group are connected to the fourth turn-on signal terminal.

Optionally, the pixels disposed in a same row are sequentially arranged in a first color, a second color, and a third color, and the pixels disposed in the same column are of a same color.

Optionally, in two adjacent pixel groups connected to a same data line, one of the pixels is disposed in a same column.

Optionally, each data line includes: a plurality of data line segments and a plurality of connecting line segments;

wherein two ends of each connecting line segment are respectively connected to two adjacent data line segments; and each of the pixel groups corresponds to one data line segment, and any two adjacent data line segments are respectively disposed between two pixels in the pixel groups in different columns and adjacent rows.

Optionally, in the two adjacent pixel groups connected to the same data line, at least two pixels are disposed in a same column.

According to another aspect, a method for driving a display substrate is provided. The method is applied to drive the display substrate according to the above aspect. The method includes:

sequentially providing turn-on signals to turn-on signal terminals in the display substrate, and providing, by each shift circuit, a gate driving signal to each connected gate line in response to the turn-on signal; and providing a data signal to each data line in the display substrate, wherein each pixel in the display substrate emits light in response to the gate driving signal provided by the connected gate line and the data signal provided by the connected data line.

Optionally, the display substrate includes four shift circuits including a first shift circuit, a second shift circuit, a third shift circuit, and a fourth shift circuit, and four turn-on signal terminals including a first turn-on signal terminal, a second turn-on signal terminal, a third turn-on signal terminal and a fourth turn-on signal terminal; wherein the first turn-on signal terminal is connected to the first shift circuit, the third turn-on signal terminal is connected to the second shift circuit, the second turn-on signal terminal is connected to the third shift circuit, and the fourth turn-on signal terminal is connected to the fourth shift circuit; and sequentially providing the turn-on signals to respective turn-on signal terminals in the display substrate includes:

sequentially providing the turn-on signals to the first turn-on signal terminal, the third turn-on signal terminal, the second turn-on signal terminal, and the fourth turn-on signal terminal.

Optionally, each shift circuit includes at least four shift register units, each shift register unit is connected to a gate line, and the at least four shift register units of each shift circuit can be divided into two shift register groups; each shift register group includes a plurality of cascading shift register units, and one shift register unit in each shift register group is connected to the turn-on signal terminal; each shift register group includes a plurality of shift register sub-groups, each shift register sub-group includes two adjacent and cascaded shift register units, one of which is connected to an $i^{th}$ gate line and the other of which is connected to an $(i+2)^{th}$ gate line, wherein the $i^{th}$ gate line and the $(i+2)^{th}$ gate line are adjacent to each other, i being a positive integer;

providing, by each shift circuit, the gate driving signal to each connected gate line in response to the turn-on signal includes the following steps in sequence:

in the first shift circuit, providing, by the shift register unit connected to a first gate line, a gate driving signal to the first gate line and a carry signal to a shift register unit connected to a third gate line, in response to a turn-on signal provided by the first turn-on signal terminal;

in the second shift circuit, providing, by a shift register unit connected to a fifth gate line, a gate driving signal to the fifth gate line and a carry signal to a shift register unit connected to a seventh gate line, in response to a turn-on signal provided by the third turn-on signal terminal;

in the first shift circuit, providing, by a shift register unit connected to a ninth gate line, a gate driving signal to the ninth gate line and a carry signal to a shift register unit connected to an eleventh gate line, in response to the turn-on signal provided by the first turn-on signal terminal;

in the second shift circuit, providing, by a shift register unit connected to a thirteenth gate line, a gate driving signal to the thirteenth gate line and a carry signal to a shift register unit connected to a fifteenth gate line, in response to the turn-on signal provided by the third turn-on signal terminal;

in the first shift circuit, providing, by the shift register unit connected to the third gate line, a gate driving signal to the third gate line in response to the received carry signal;

in the second shift circuit, providing, by the shift register unit connected to the seventh gate line, a gate driving signal to the seventh gate line in response to the received carry signal;

in the first shift circuit, providing, by the shift register unit connected to the eleventh gate line, a gate driving signal to the eleventh gate line in response to the received carry signal;

in the second shift circuit, providing, by the shift register unit connected to the fifteenth gate line, a gate driving signal to the fifteenth gate line in response to the received carry signal;

in the third shift circuit, providing, by a shift register unit connected to a second gate line, a gate driving signal to the second gate line and a carry signal to a shift register unit connected to a fourth gate line, in response to a turn-on signal provided by the second turn-on signal terminal;

in the fourth shift circuit, providing, by a shift register unit connected to a sixth gate line, a gate driving signal to the sixth gate line and a carry signal to a shift register unit connected to an eighth gate line, in response to a turn-on signal provided by the fourth turn-on signal terminal;

in the third shift circuit, providing, by a shift register unit connected to a tenth gate line, a gate driving signal to the tenth gate line and a carry signal to a shift register unit connected to a twelfth gate line, in response to the turn-on signal provided by the second turn-on signal terminal;

in the fourth shift circuit, providing, by a shift register unit connected to an fourteenth gate line, a gate driving signal to the fourteenth gate line and a carry signal to a shift register unit connected to an sixteenth gate line, in response to the turn-on signal provided by the fourth turn-on signal terminal;

in the third shift circuit, providing, by the shift register unit connected to the fourth gate line, a gate driving signal to the fourth gate line in response to the received carry signal;

in the fourth shift circuit, providing, by the shift register unit connected to the eighth gate line, a gate driving signal to the eighth gate line in response to the received carry signal;

in the third shift circuit, providing, by the shift register unit connected to the twelfth gate line, a gate driving signal to the twelfth gate line in response to the received carry signal;

and in the fourth shift circuit, providing, by the shift register unit connected to the sixteenth gate line, a gate driving signal to the sixteenth gate line in response to the received carry signal.

Optionally, each shift circuit includes at least four shift register units, each shift register unit is connected to a gate line, and the at least four shift register units of each shift circuit are capable of being divided into two shift register groups; each shift register group includes a plurality of cascaded shift register units, and one shift register unit in each shift register group is connected to the turn-on signal terminal; each shift register group includes a plurality of shift register sub-groups, each shift register sub-group includes two adjacent and cascaded shift register units, one of which is connected to an $i^{th}$ gate line and the other of which is connected to an $(i+1)^{th}$ gate line, wherein the $i^{th}$ gate line and the $(i+1)^{th}$ gate line are adjacent to each other, i being a positive integer; and providing, by each shift circuit, the gate driving signal to each connected gate line in response to the turn-on signal includes the following steps in sequence:

in the first shift circuit, providing, by a shift register unit connected to a first gate line, a gate driving signal to the first gate line and a carry signal to a shift register unit connected to a second gate line, in response to a turn-on signal provided by the first turn-on signal terminal;

in the second shift circuit, providing, by a shift register unit connected to a fifth gate line, a gate driving signal to the fifth gate line and a carry signal to a shift register unit connected to a sixth gate line, in response to a turn-on signal provided by the third turn-on signal terminal;

in the first shift circuit, providing, by a shift register unit connected to a ninth gate line, a gate driving signal to the ninth gate line and a carry signal to a shift register unit connected to a tenth gate line, in response to the turn-on signal provided by the first turn-on signal terminal;

in the second shift circuit, providing, by a shift register unit connected to a thirteenth gate line, a gate driving signal to the thirteenth gate line and a carry signal to a shift register unit connected to a fourteenth gate line, in response to the turn-on signal provided by the third turn-on signal terminal;

in the third shift circuit, providing, by a shift register unit connected to a third gate line, a gate driving signal to the third gate line and a carry signal to a shift register unit connected to a fourth gate line, in response to a turn-on signal provided by the second turn-on signal terminal;

in the fourth shift circuit, providing, by a shift register unit connected to a seventh gate line, a gate driving signal to the seventh gate line and a carry signal to a shift register unit connected to an eighth gate line, in response to a turn-on signal provided by the fourth turn-on signal terminal;

in the third shift circuit, providing, by a shift register unit connected to an eleventh gate line, a gate driving signal to the eleventh gate line and a carry signal to a shift register unit connected to a twelfth gate line, in response to the turn-on signal provided by the second turn-on signal terminal;

in the fourth shift circuit, providing, by a shift register unit connected to a fifteenth gate line, a gate driving signal to the fifteenth gate line and a carry signal to the shift register unit connected to a sixteenth gate line, in response to the turn-on signal provided by the fourth turn-on signal terminal;

in the first shift circuit, providing, by the shift register unit connected to the second gate line, a gate driving signal to the second gate line in response to the received carry signal;

in the second shift circuit, providing, by the shift register unit connected to the sixth gate line, a gate driving signal to the sixth gate line in response to the received carry signal;

in the first shift circuit, providing, by the shift register unit connected to the tenth gate line, a gate driving signal to the tenth gate line in response to the received carry signal;

in the second shift circuit, providing, by the shift register unit connected to the fourteenth gate line, a gate driving signal to the fourteenth gate line in response to the received carry signal;

in the third shift circuit, providing, by the shift register unit connected to the fourth gate line, a gate driving signal to the fourth gate line in response to the received carry signal;

in the fourth shift circuit, providing, by the shift register unit connected to the eighth gate line, a gate driving signal to the eighth gate line in response to the received carry signal;

in the third shift circuit, providing, by the shift register unit connected to the twelfth gate line, a gate driving signal to the twelfth gate line in response to the received carry signal; and in the fourth shift circuit, providing, by the shift register unit connected to the sixteenth gate line, a gate driving signal to the sixteenth gate line in response to the received carry signal.

According to yet another aspect, a display device is provided. The display device includes: a signal providing circuit and the display substrate as defined in the above aspect, wherein the signal providing circuit is connected to a turn-on signal terminal in the display substrate and is configured to provide a turn-on signal to the turn-on signal terminal.

BRIEF DESCRIPTION OF THE DRAWINGS

For clearer descriptions of the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

To make the objectives, technical solutions and advantages of the present disclosure clearer, the embodiments of the present disclosure are described in detail below with reference to the accompanying drawings.

A dual-gate LCD device is provided in the related art. The dual-gate LCD device includes a plurality of gate lines, a plurality of data lines and a plurality of pixels arranged in an array. The plurality of pixels in the same row can be divided into a plurality of groups. Each group of pixels may include two adjacent pixels of different colors, and the two pixels may be connected to different gate lines respectively, and may be connected to the same data line. That is, each row of pixels may be connected to two gate lines. Currently, the scan driving manner of the dual-gate LCD device is line-by-line scan. That is, the plurality of gate lines are powered on sequentially according to the order of arrangement, so as to drive the pixels of each row to emit light sequentially.

However, when a pure-color picture is to be displayed, potential of each data line needs to be continuously changed (or referred to as reversed) in the related art, which results in high power consumption.

Figure 1:
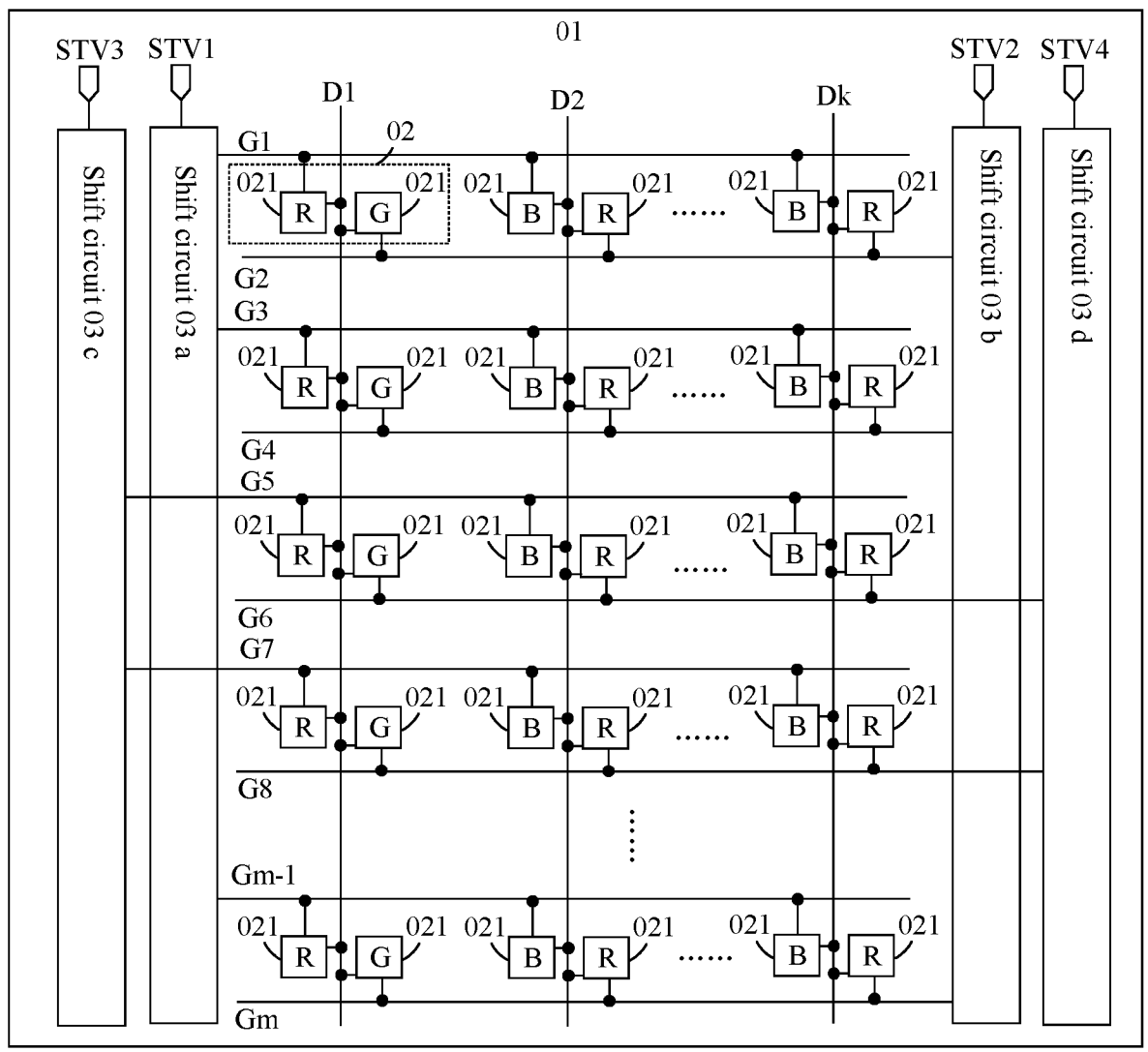
FIG. 1 is a schematic structural diagram of a display substrate according to an embodiment of the present disclosure.

FIG. 1 is a schematic structural diagram of a display substrate according to an embodiment of the present disclosure. As shown in FIG. 1, the display substrate may include: a base substrate 01, and a plurality of gate lines G1 to Gm, a plurality of data lines D1 to Dk and a plurality of rows of pixels arranged in an array (not shown in the drawings), which are disposed on the base substrate 01. Both m and k are integers greater than 0. Each row of pixels may include a plurality of pixel groups 02. Each pixel group 02 may include two adjacent pixels 021 of different colors, and the two adjacent pixels 021 are connected to different gate lines and the same data line. That is, referring to FIG. 1, a plurality of pixels 021 in the same row may be connected to two gate lines, and two pixels 021 connected to the same data line may be connected to different gate lines.

For example, for the first pixel 021 and the second pixel 021 which are disposed in the first row and are adjacent to each other, the first pixel 021 is connected to the first gate line G1, the second pixel 021 is connected to the second gate line G2, and the first pixel 021 and the second pixel 021 are both connected to the first data line D1. It can be seen that the number k of the data lines that need to be disposed in the display substrate is only ½ of the number of the columns of the pixels. Correspondingly, the number of leads in the bonding area is also reduced, which is beneficial to achieve a narrow frame. Based on the connections shown in FIG. 1, it can be seen that the display substrate in the embodiments of the present disclosure is a display substrate with a zigzag structure.

Optionally, the display substrate according to the embodiments of the present disclosure may also include a plurality of shift circuits disposed on the base substrate 01. Each shift circuit may be connected to one turn-on signal terminal and at least two gate lines of the plurality of gate lines. Each shift circuit may be configured to provide a gate driving signal to each connected gate line in response to a turn-on signal provided by the turn-on signal terminal. That is, each shift circuit may provide the gate driving signal to each connected gate line when the connected turn-on signal terminal provides the turn-on signal. In addition, in the embodiments of the present disclosure, in the plurality of pixels 021 connected to each shift circuit, colors of the pixels 21 connected to the same data line are the same.

For example, the display substrate shown in FIG. 1 includes four shift circuits, i.e., shift circuit 03a, shift circuit 03b, shift circuit 03c, and shift circuit 03d. Shift circuit 03a and shift circuit 03c are disposed on one side of the extending direction of the gate line, and shift circuit 03b and shift circuit 03d are disposed on the other side of the extending direction of the gate line. The shift circuit 03a is connected to a turn-on signal terminal STV1, the first gate line G1, a third gate line G3, and a $(m-1)^{th}$ gate line Gm-1. Besides, in the pixels 021 connected to the first gate line G1, the third gate line G3 and the $(m-1)^{th}$ gate line Gm-1, that is, the pixels 021 connected to the shift circuit 03a, the colors of the pixels 021 connected to the first data line D1 (that is, the pixel 021 in the first row and the first column, the pixel 021 in the second row and the first column, and the pixel 021 in the $m^{th}$ row and the first column) may all be red (R).

The shift circuit 03b is connected to a turn-on signal terminal STV2, the second gate line G2, a fourth gate line G4, and the $m^{th}$ gate line Gm. Besides, in the pixels 021 connected to the second gate line G2, the fourth gate line G4, and the $m^{th}$ gate line Gm, that is, the pixels 021 connected to the shift circuit 03b, the colors of the pixels 021 connected to the first data line D1 (that is, the pixel 021 in the first row and the second column, the pixel 021 in the second row and the second column, and the pixel 021 in the $m^{th}$ row and the second column) may all be green (G).

The shift circuit 03c is connected to a turn-on signal terminal STV3, a fifth gate line G5 and a seventh gate line G7. Besides, in the pixels 021 connected to the fifth gate line G5 and the seventh gate line G7, that is, the pixels 021 connected to the shift circuit 03c, the colors of the pixels 021 connected to the second data line D2 (that is, the pixel 021 in the third row and the third column and the pixel 021 in the fourth row and the third column) may all be blue (B).

The shift circuit 03d is connected to a turn-on signal terminal STV4, a sixth gate line G6 and an eighth gate line G8. Besides, in the pixels 021 connected to the sixth gate line G6 and the eighth gate line G8, that is, the pixels 021 connected to the shift circuit 03d, the colors of the pixels 021 connected to the second data line D2 (that is, the pixel 021 in the third row and the fourth column and the pixel 021 in the fourth row and the fourth column) may all be red (R).

Each of the above four shift circuits 03a to 03d is not only connected to the gate lines shown in FIG. 1, but also connected to other gate lines not shown in FIG. 1, which is not repeated herein.

By taking the shift circuit 03a connected to the turn-on signal terminal STV1 as an example, when the turn-on signal terminal STV1 provides a turn-on signal, the shift circuit 03a may sequentially provide a gate driving signal to the gate line G1, the gate line G3, and the gate line Gm-1. Then, the first data line D1 may sequentially provide a data signal to the pixel 021 in the first row and the first column, the pixel 021 in the second row and first column, and the pixel 021 in the $m^{th}$ row and the first column. Based on the foregoing descriptions, since the pixel 021 in the first row and the first column, the pixel 021 in the second row and the first column and the pixel 021 in the $m^{th}$ row and the first column are of the same color, the first data line D1 can continuously provide the data signals to the pixels of the same color. Therefore, when a pure-color picture is displayed, the potential of the data signal provided by the first data line D1 does not need to be continuously reversed, which effectively reduces power consumption. This is also the case for other data lines, and details are not repeated herein.

In summary, the embodiment of the present disclosure provides a display substrate. In the display substrate, in the plurality of pixels connected to each shift circuit, the pixels sharing the same data line are of the same color, and each shift circuit is connected to one turn-on signal terminal. Therefore, by flexible control over the turn-on signal provided by the turn-on signal terminal, each data line can continuously provide data signals to the pixels of the same color. Therefore, when the pure-color picture is displayed, the number of times of potential reversal on each data line is less, which effectively reduces power consumption of the display device.

Figure 2:
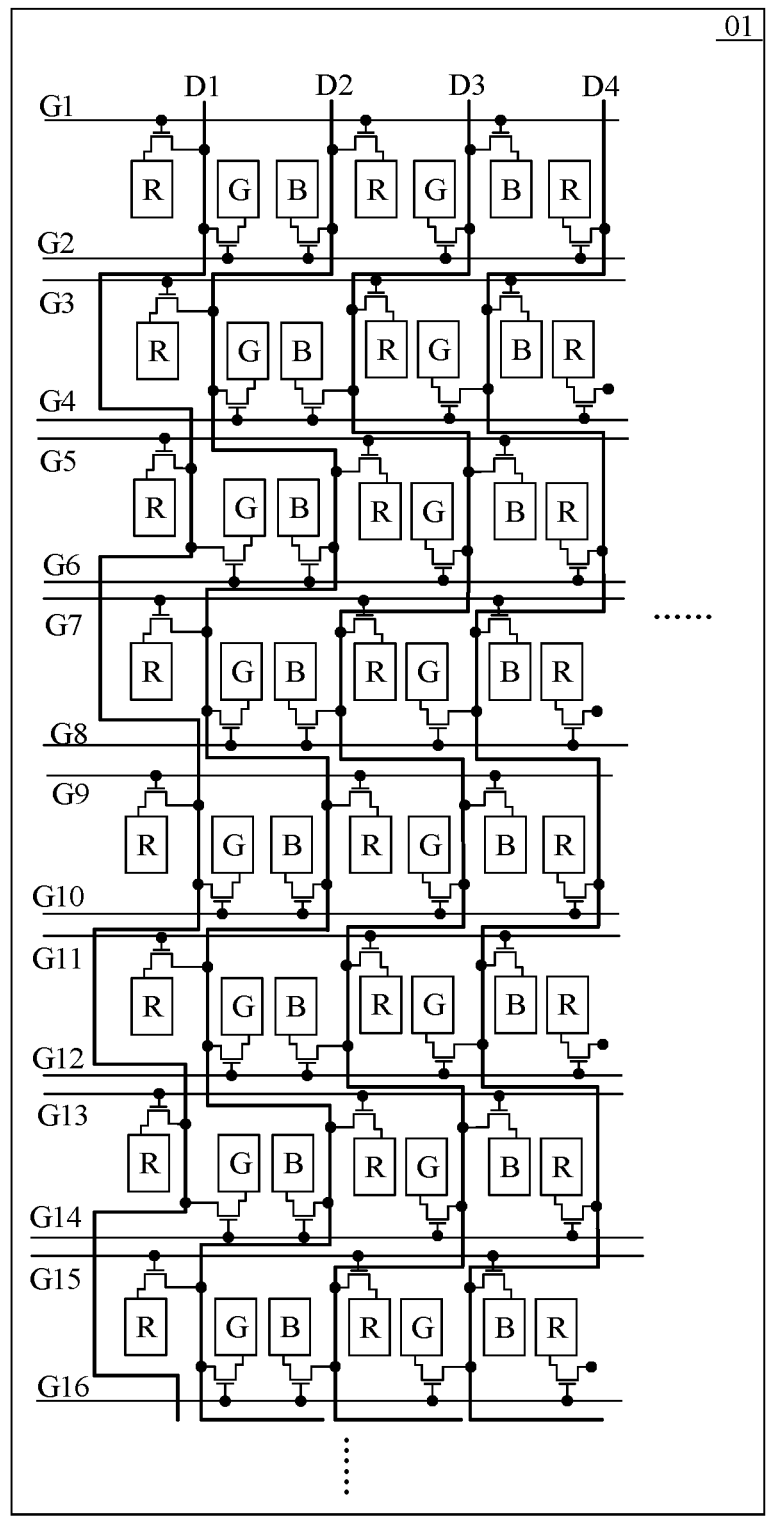
FIG. 2 is a schematic structural diagram of another display substrate according to an embodiment of the present disclosure.

FIG. 2 is a schematic structural diagram of another display substrate according to an embodiment of the present disclosure. In combination with FIG. 1 and FIG. 2, it can be seen that the pixels 021 disposed in the same row may be sequentially arranged in a first color, a second color, and a third color. Optionally, the first color may be red R, the second color may be green G, and the third color may be blue B. That is, as shown in FIG. 2, each row of pixels 021 in the display substrate may be arranged in the sequence of colors of RGB. Of course, the pixels in the display substrate are not limited to be of three colors of RGB, and may also be of other colors such as yellow (Y) and white (W).

In addition, in two adjacent pixel groups 02 connected to the same data line, the pixels 021 may be disposed in different columns. Alternatively, in two adjacent pixel groups 02 connected to the same data line, at least two pixels 021 may be disposed in the same column.

For example, referring to FIG. 2, by taking the second data line D2 as an example, in the pixel groups 02 connected to the data line D2 and disposed in the first row and the second row, one pixel B in the pixel group 02 in the first row is disposed in the third column, and the other pixel R is disposed in the fourth column. One pixel R in the pixel group 02 in the second row is disposed in the first column, and the other pixel G is disposed in the second column, that is, the four pixels 021 are disposed in different columns.

Regarding the above arrangement, each data line may be arranged in a bow shape on the base substrate 01. That is, each data line may include: a plurality of data line segments and a plurality of connecting line segments. Two ends of each connecting line segment are respectively connected to two adjacent data line segments; each pixel group corresponds to one data line segment, and any two adjacent data line segments are respectively disposed between two pixels included in the pixel groups in adjacent rows and different columns. In addition, the directions of two adjacent openings of each data line arranged in bow shape are not limited in the embodiments of the present disclosure. All of the following embodiments take the display substrate shown in FIG. 2 as an example for illustration.

Figure 3:
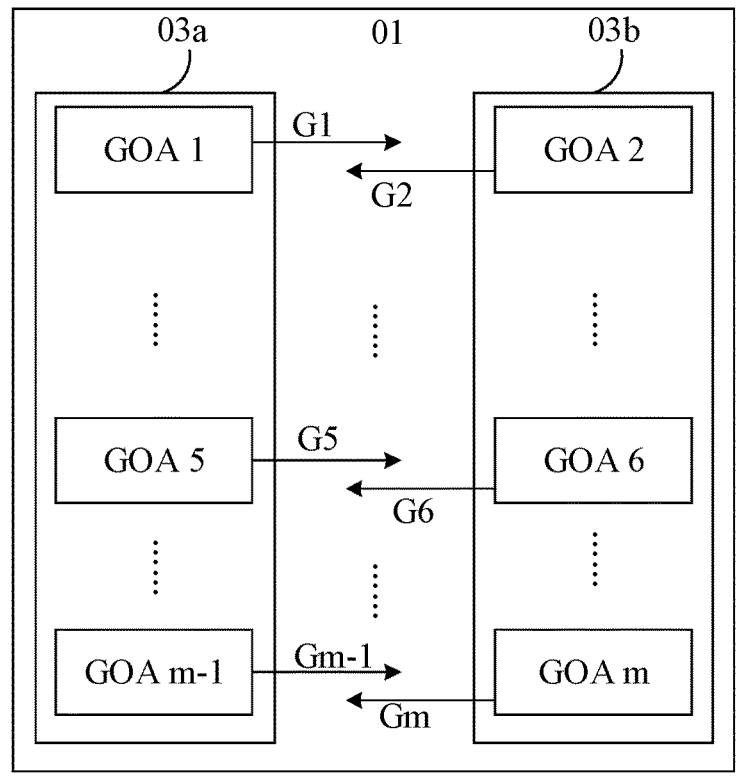
FIG. 3 is a schematic structural diagram of yet another display substrate according to an embodiment of the present disclosure.

In combination with FIG. 1, by taking the shift circuits 03a and 03b as an example, FIG. 3 shows a schematic structural diagram of another display substrate. Referring to FIG. 3, it can be seen that each shift circuit may include at least four shift register units, and each shift register unit may be connected to one gate line. Therefore, it can be known that since the display substrate includes m gate lines in total, i.e., gate lines G1 to Gm, in conjunction with FIG. 1 and FIG. 3, the display substrate may include m shift register units GOA1 to GOAm in total. The first shift register unit GOA1 may be connected to the first gate line G1, and so on.

Optionally, a number d of clock signal terminals connected to the plurality of shift circuits in the display substrate may be an integral multiple of 4. That is, the plurality of rows of pixels in the display substrate may be driven by a clock with a phase that is an integral multiple of 4. Alternatively, the number of the clock signal terminals connected to the plurality of shift circuits may also be an integral multiple of 2.

For example, assuming that the number d of the clock signal terminals connected to the plurality of shift circuits is 16, then the plurality of rows of pixels in the display substrate are driven by a 16-phase clock. In conjunction with the display substrate shown in FIG. 4 and FIG. 5, driving by a 16-phase clock is that from the first shift register unit GOA1, every adjacent 16 shift register units are sequentially connected to 16 clock signal terminals CLK1 to CLK16. In the following embodiments of the present disclosure, the display substrate is illustrated by taking the 16-phase clock as an example.

Figure 6:
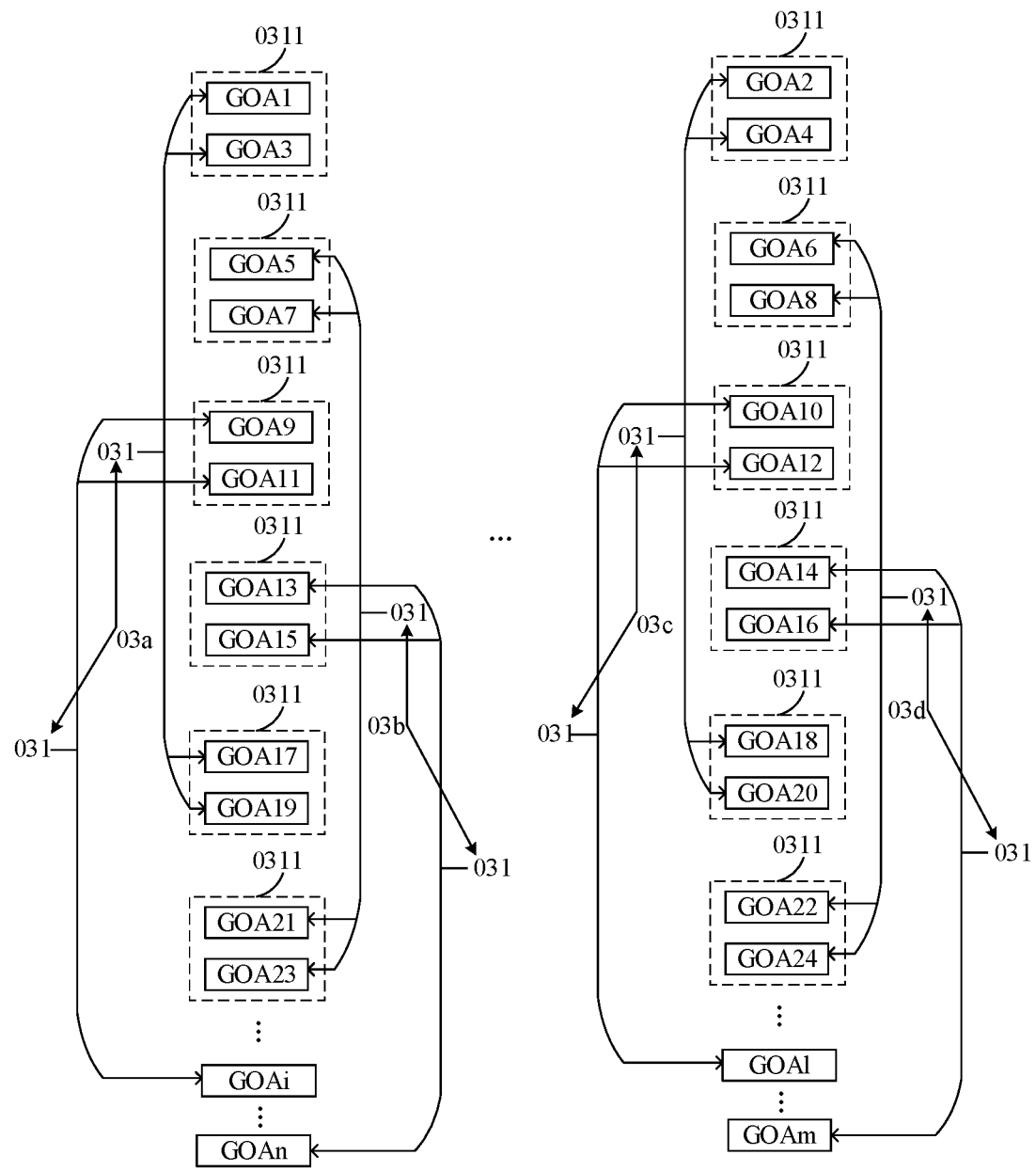
FIG. 6 is a schematic structural diagram of still another display substrate according to an embodiment of the present disclosure.
Figure 7:
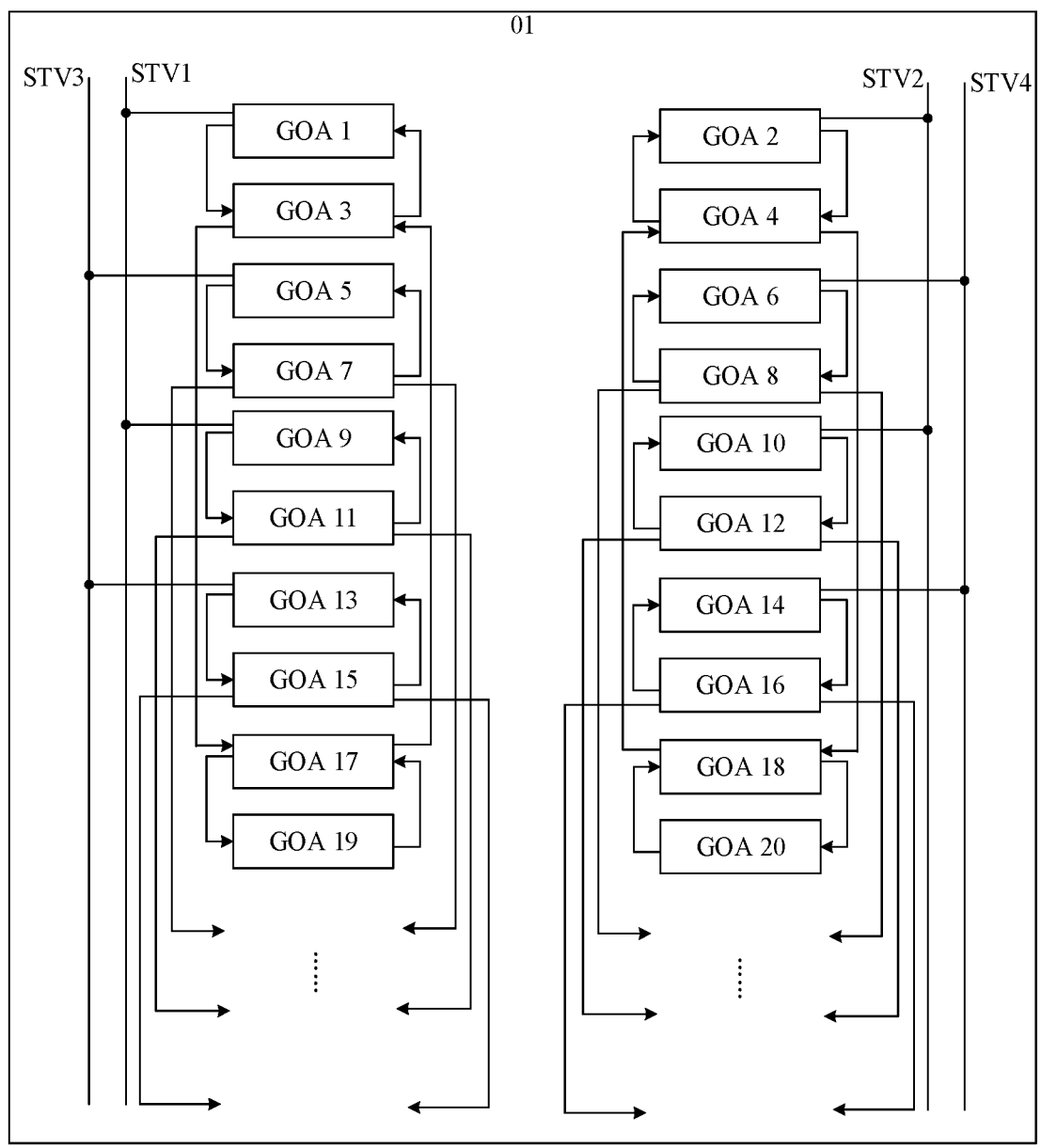
FIG. 7 is a schematic structural diagram of still another display substrate according to an embodiment of the present disclosure.
Figure 8:
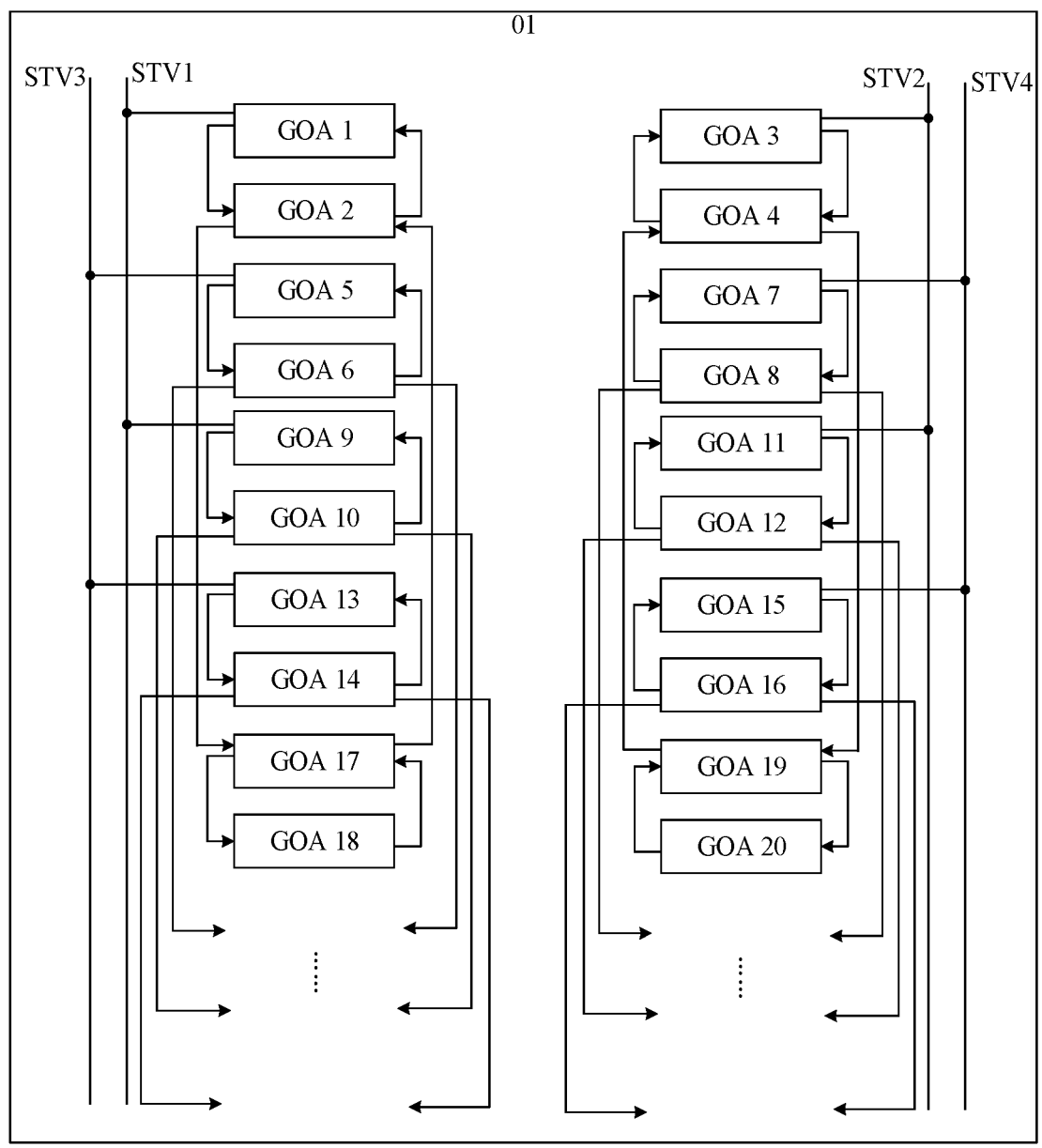
FIG. 8 is a schematic structural diagram of still another display substrate according to an embodiment of the present disclosure.

Optionally, in conjunction with FIG. 1 and the following FIG. 6 to FIG. 8, it can be seen that the display substrate may include a total of 4 shift circuits, i.e., the first shift circuit 03a, the second shift circuit 03b, the third shift circuit 03c, and the fourth shift circuit 03d. Moreover, the first shift circuit 03a and the second shift circuit 03b may be disposed on one side of the plurality of rows of pixels 021, and the third shift circuit 03c and the fourth shift circuit 03d may be disposed on the other side of the plurality of rows of pixels. The display substrate further includes a total of four turn-on signal terminals STV1 to STV4. The first shift circuit 03a is connected to the turn-on signal terminal STV1, the second shift circuit 03b is connected to the turn-on signal terminal STV3, the third shift circuit 03c is connected to the turn-on signal terminal STV2, and the fourth shift circuit 03d is connected to the turn-on signal terminal STV4.

Referring to FIG. 6 and FIG. 8, it can also be seen that the at least four shift register units in each shift circuit may be divided into two shift register groups 031, and each shift register group 031 may further include a plurality of shift register sub-groups 0311. Each shift register group 031 may include a plurality of cascaded shift register units, and each shift register sub-group 0311 may include two adjacent cascaded shift register units. Besides, the turn-on signal terminal is connected to only one shift register unit in one shift register group 031. For example, in the display substrate shown in FIG. 7 and FIG. 8, in each shift register group 031, the first shift register unit in the first shift register sub-group 0311 (for example, GOA1, GOA9, GOA5 and GOA13) is connected to the turn-on signal terminal.

It should be noted that, in conjunction with FIG. 6 and FIG. 7, in a target direction from the first row to the last row, the plurality of shift register sub-groups 0311 in each shift register group 031 are arranged in sequence, and the two shift register units in each shift register sub-group 0311 are arranged in sequence. Correspondingly, the first shift register sub-group 0311 in each shift register group 031 may be the shift register sub-group at the start position in the target direction. For example, for the first shift register group 031 in the shift circuit 03a, the first shift register sub-group 0311 is the shift register sub-group including GOA1 and GOA3. The first shift register unit included in each shift register sub-group 0311 may be the shift register unit at the start position in the target direction. For example, for the shift register sub-group 0311 including GOA1 and GOA3, the first shift register unit is GOA1.

With reference to FIG. 6 to FIG. 8, the $(2n-1)^{th}$ shift register sub-group 0311 at one side of the plurality of rows of pixels may belong to the first shift circuit 03a, and the $2n^{th}$ shift register sub-group 0311 at one side of the plurality of rows of pixels may belong to the second shift circuit 03b. The $(2n-1)^{th}$ shift register sub-group 0311 at the other side of the plurality of rows of pixels may belong to the third shift circuit 03c, the $2n^{th}$ shift register sub-group 0311 at the other side of the plurality of rows of pixels may belong to the fourth shift circuit 03d, and n may be a positive integer. That is, the shift register sub-groups 0311 with odd serial numbers disposed on the same side may belong to the same shift circuit, and the shift register sub-groups 0311 with even serial numbers disposed on the same side may belong to the same shift circuit.

In this implementation, for the first shift circuit 03a and the second shift circuit 03b, the $(4n-3)^{th}$ shift register sub-group 0311 at the side thereof may belong to one shift register group 031 in the first shift circuit 03a, and the $(4n-1)^{th}$ shift register sub-group 0311 may belong to the other shift register group 031 in the first shift circuit 03a. The $(4n-2)^{th}$ shift register sub-group 0311 may belong to one shift register group 031 in the second shift circuit 03b, and the $4n^{th}$ shift register sub-group 0311 may belong to the other shift register group 031 in the second shift circuit 03b. For the third shift circuit 03c and the fourth shift circuit 03d, the $(4n-3)^{th}$ shift register sub-group 0311 at the side thereof may belong to one shift register group 031 in the third shift circuit 03c, and the $(4n-1)^{th}$ shift register sub-group 0311 may belong to the other shift register group 031 in the third shift circuit 03c. The $(4n-2)^{th}$ shift register sub-group 0311 may belong to one shift register group 031 in the fourth shift circuit 03d, and the $4n^{th}$ shift register sub-group 0311 may belong to the other shift register group 031 in the fourth shift circuit 03d.

For example, referring to FIG. 6 to FIG. 8, on the side of the first shift circuit 03a and the second shift circuit 03b, in the direction from the first row of pixels to the last row of pixels, the first shift register sub-group 0311 and the fifth shift register sub-group 0311 belong to one shift register group 031 in the first shift circuit 03a. The second shift register sub-group 0311 and the sixth shift register sub-group 0311 belong to one shift register group 031 in the second shift circuit 03b. The third shift register sub-group 0311 and the seventh shift register sub-group 0311 belong to the other shift register group 031 in the first shift circuit 03a. The fourth shift register sub-group 0311 and the eighth shift register sub-group 0311 belong to the other shift register group 031 in the second shift circuit 03b. This is also the case for the side of the third shift circuit 03c and the fourth shift circuit 03d. The first shift register sub-group 0311 and the fifth shift register sub-group 0311 belong to one shift register group 031 in the third shift circuit 03c. The second shift register sub-group 0311 and the sixth shift register sub-group 0311 belong to one shift register group 031 in the fourth shift circuit 03d. The third shift register sub-group 0311 and the seventh shift register sub-group 0311 belong to the other shift register group 031 in the third shift circuit 03c. The fourth shift register sub-group 0311 and the eighth shift register sub-group 0311 belong to the other shift register group 031 in the fourth shift circuit 03d.

For another example, in conjunction with the display substrate shown in FIG. 6 and FIG. 7, in the direction from the first row of pixels to the last row of pixels, by taking the first shift register group 031 in the first shift circuit 03a as an example, the shift register units GOA1 and GOA3 included in the first shift register sub-group 0311 in the shift register group 031 are cascade-connected to each other, the shift register unit GOA3 and the shift register unit GOA17 in the second shift register sub-group 0311 are cascade-connected to each other, and the shift register unit GOA17 and the shift register unit GOA19 in the second shift register sub-group 0311 are also cascade-connected to each other. In addition, in the shift register group 031, the first shift register unit GOA1 in the first shift register sub-group 0311 is connected to the turn-on signal terminal STV1, and so on.

Optionally, in the embodiments of the present disclosure, the two shift register units in each shift register sub-group 0311 may be respectively connected to an $i^{th}$ gate line and an $(i+s)^{th}$ gate line, i is a positive integer and s may be 1 or 2.

Figure 4:
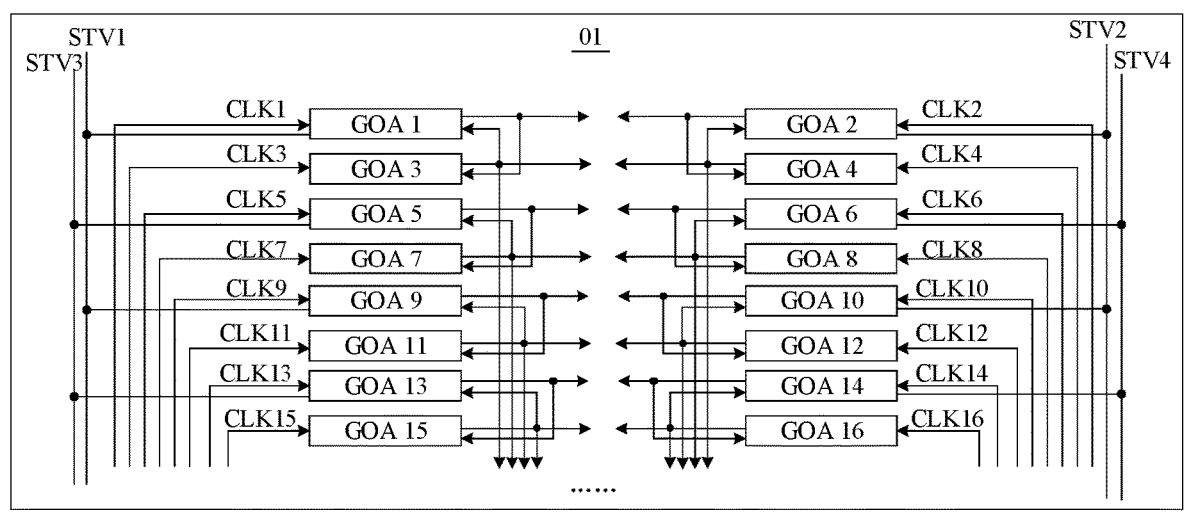
FIG. 4 is a schematic structural diagram of still another display substrate according to an embodiment of the present disclosure.

For example, in the display substrate shown in FIG. 4, FIG. 6 and FIG. 7, s is 2. That is, the shift register units with odd serial numbers are disposed on the same side, and the shift register units with even serial numbers are disposed on the same side. In this way, the pixels in the same row can be simultaneously driven by the shift register units disposed on both sides. That is, the pixels in the same rows are driven bilaterally.

Assuming that the shift register unit connected to the $i^{th}$ gate line is the $i^{th}$ shift register unit, and the number d of clock signals is 16, then the cascaded relationship of the display substrate is described as follows, in conjunction with FIG. 4, FIG. 6 and FIG. 7.

The first shift register unit GOA1 and the third shift register unit GOA3 are cascade-connected to each other. The first shift register unit GOA1 may be configured to provide a carry signal to the third shift register unit GOA3, and the third shift register unit GOA3 may be configured to provide a reset signal to the first shift register unit GOA1.

The third shift register unit GOA3 and the $(1+16)^{th}$, i.e., the seventeenth shift register unit are further cascade-connected to each other (not shown in the figure). The third shift register unit GOA3 may be configured to provide a carry signal to the seventeenth shift register unit, and the seventeenth shift register unit may be configured to provide a reset signal to the third shift register unit GOA3.

The fifth shift register unit GOA5 and the seventh shift register unit GOA7 are cascade-connected to each other, the fifth shift register unit GOA5 may be configured to provide a carry signal to the seventh shift register unit GOA7, and the seventh shift register unit GOA7 may be configured to provide a reset signal to the fifth shift register unit GOA5.

The seventh shift register unit GOA7 and the $(5+16)^{th}$, i.e., the twenty-first shift register unit are further cascade-connected to each other (not shown in the figure), the seventh shift register unit GOA7 may be configured to provide a carry signal to the twenty-first shift register unit, and the twenty-first shift register unit may be configured to provide a reset signal to the seventh shift register unit GOA7.

The ninth shift register unit GOA9 and the eleventh shift register unit GOA11 are cascade-connected to each other, the ninth shift register unit GOA9 is configured to provide a carry signal to the eleventh shift register unit GOA11, and the eleventh shift register unit GOA11 is configured to provide a reset signal to the ninth shift register unit GOA9.

The eleventh shift register unit GOA11 and the $(9+16)^{th}$, i.e., twenty-fifth shift register unit are further cascade-connected to each other (not shown in the figure), the eleventh shift register unit GOA11 is configured to provide a carry signal to the twenty-fifth shift register unit, and the twenty-fifth shift register unit is configured to provide a reset signal to the eleventh shift register unit GOA11.

The thirteenth shift register unit GOA13 and the fifteenth shift register unit GOA15 are cascade-connected to each other, the thirteenth shift register unit GOA13 is configured to provide a carry signal to the fifteenth shift register unit GOA15, and the fifteenth shift register unit GOA15 is configured to provide a reset signal to the thirteenth shift register unit GOA13.

The fifteenth shift register unit GOA15 and the $(13+16)^{th}$, i.e., twenty-ninth shift register unit are further cascade-connected to each other (not shown in the figure), the fifteenth shift register unit GOA15 is configured to provide a carry signal to the twenty-ninth shift register unit, and the twenty-ninth shift register unit is configured to provide a reset signal to the fifteenth shift register unit GOA15.

The second shift register unit GOA2 and the fourth shift register unit GOA4 are cascade-connected to each other, the second shift register unit GOA2 is configured to provide a carry signal to the fourth shift register unit GOA4, and the fourth shift register unit GOA4 is configured to provide a reset signal to the second shift register unit GOA2.

The fourth shift register unit GOA4 and the $(2+16)^{th}$, i.e., eighteenth shift register unit are further cascade-connected to each other (not shown in the figure), the fourth shift register unit GOA4 is configured to provide a carry signal to the eighteenth shift register unit, and the eighteenth shift register unit is configured to provide a reset signal to the fourth shift register unit GOA4.

The sixth shift register unit GOA6 and the eighth shift register unit GOA8 are cascade-connected to each other, the sixth shift register unit GOA6 is configured to provide a carry signal to the eighth shift register unit GOA8, and the eighth shift register unit GOA8 is configured to provide a reset signal to the sixth shift register unit GOA6.

The eighth shift register unit GOA8 and the $(6+16)^{th}$, i.e., twenty-second shift register unit are further cascade-connected to each other (not shown in the figure), the eighth shift register unit GOA8 may be configured to provide a carry signal to the twenty-second shift register unit, and the twenty-second shift register unit is configured to provide a reset signal to the eighth shift register unit GOA8.

The tenth shift register unit GOA10 and the twelfth shift register unit GOA12 are cascade-connected to each other, the tenth shift register unit GOA10 is configured to provide a carry signal to the twelfth shift register unit GOA12, and the twelfth shift register unit GOA12 is configured to provide a reset signal to the tenth shift register unit GOA10.

The twelfth shift register unit GOA12 and the $(10+16)^{th}$, i.e., twenty-sixth shift register unit are further cascade-connected to each other (not shown in the figure), the twelfth shift register unit GOA12 is configured to provide a carry signal to the twenty-sixth shift register unit, and the twenty-sixth shift register unit is configured to provide a reset signal to the twelfth shift register unit GOA12.

The fourteenth shift register unit GOA14 and the sixteenth shift register unit GOA16 are cascade-connected to each other, the fourteenth shift register unit GOA14 is configured to provide a carry signal to the sixteenth shift register unit GOA16, and the sixteenth shift register unit GOA16 is configured to provide a reset signal to the fourteenth shift register unit GOA14.

The sixteenth shift register unit GOA16 and the $(14+16)^{th}$, i.e., thirtieth shift register unit are further cascade-connected to each other (not shown in the figure), the sixteenth shift register unit GOA16 is configured to provide a carry signal to the thirtieth shift register unit, and the thirtieth shift register unit is configured to provide a reset signal to the sixteenth shift register unit GOA16.

Figure 5:
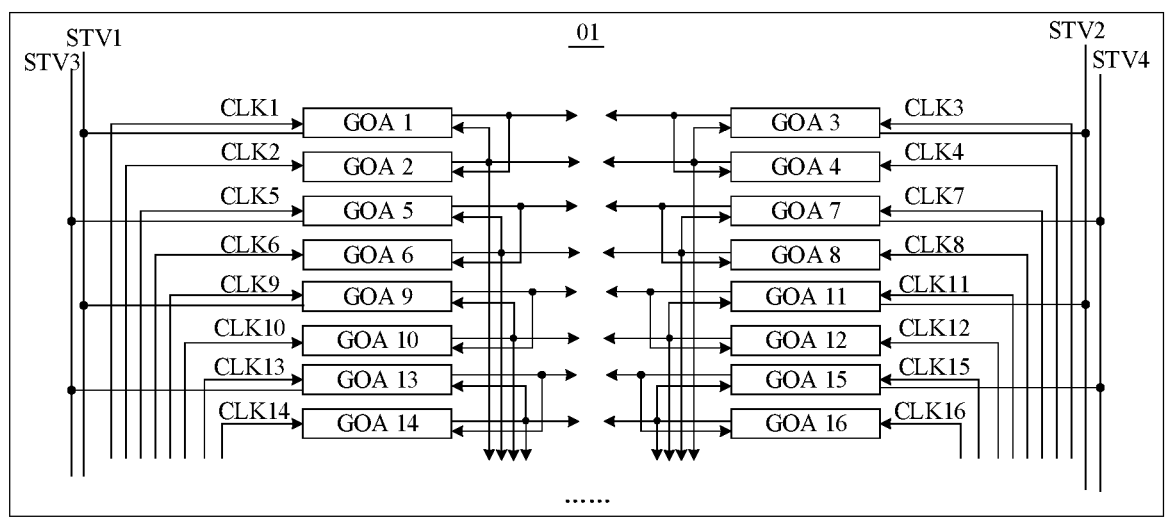
FIG. 5 is a schematic structural diagram of still another display substrate according to an embodiment of the present disclosure.

For example, in the display substrate shown in FIG. 5 and FIG. 8, s is 1. In this way, the pixels in the same row can be simultaneously driven by the shift register units disposed on the same side. That is, the pixels in the same rows are driven unilaterally.

Assuming that the shift register unit connected to the $i^{th}$ gate line is the $i^{th}$ shift register unit, and the number d of clock signals is 16, then the cascaded relationship of the display substrate is illustrated as follows, in conjunction with FIG. 5 and FIG. 8.

The first shift register unit GOA1 and the second shift register unit GOA2 are cascade-connected to each other, the first shift register unit GOA1 may be configured to provide a carry signal to the second shift register unit GOA2, and the second shift register unit GOA2 may be configured to provide a reset signal to the first shift register unit GOA1.

The second shift register unit GOA2 and the $(1+16)^{th}$, i.e., the seventeenth shift register unit are further cascade-connected to each other (not shown in the figure), the second shift register unit GOA2 may be configured to provide a carry signal to the seventeenth shift register unit, and the seventeenth shift register unit may be configured to provide a reset signal to the second shift register unit GOA2.

The third shift register unit GOA3 and the fourth shift register unit GOA4 are cascade-connected to each other, the third shift register unit GOA3 may be configured to provide a carry signal to the fourth shift register unit GOA4, and the fourth shift register unit GOA4 may be configured to provide a reset signal to the third shift register unit GOA3.

The fourth shift register unit GOA4 and the $(3+16)^{th}$, i.e., the nineteenth shift register unit are further cascade-connected to each other (not shown in the figure), the fourth shift register unit GOA4 may be configured to provide a carry signal to the nineteenth shift register unit, and the nineteenth shift register unit may be configured to provide a reset signal to the fourth shift register unit GOA4.

The fifth shift register unit GOA5 and the sixth shift register unit GOA6 are cascade-connected to each other, the fifth shift register unit GOA5 may be configured to provide a carry signal to the sixth shift register unit GOA6, and the sixth shift register unit GOA6 may be configured to provide a reset signal to the fifth shift register unit GOA5.

The sixth shift register unit GOA6 and the $(5+16)^{th}$, i.e., twenty-first shift register unit are further cascade-connected to each other (not shown in the figure), the sixth shift register unit GOA6 may be configured to provide a carry signal to the twenty-first shift register unit, and the twenty-first shift register unit may be configured to provide a reset signal to the sixth shift register unit GOA6.

The seventh shift register unit GOA7 and the eighth shift register unit GOA8 are cascade-connected to each other, the seventh shift register unit GOA7 may be configured to provide a carry signal to the eighth shift register unit GOA8, and the eighth shift register unit GOA8 may be configured to provide a reset signal to the seventh shift register unit GOA7.

The eighth shift register unit GOA8 and the $(7+16)^{th}$, i.e., twenty-third shift register unit are further cascade-connected to each other (not shown in the figure), the eighth shift register unit GOA8 may be configured to provide a carry signal to the twenty-third shift register unit, and the twenty-third shift register unit may be configured to provide a reset signal to the eighth shift register unit GOA8.

The ninth shift register unit GOA9 and the tenth shift register unit GOA10 are cascade-connected to each other, the ninth shift register unit GOA9 may be configured to provide a carry signal to the tenth shift register unit GOA10, and the tenth shift register unit GOA10 may be configured to provide a reset signal to the ninth shift register unit GOA9.

The tenth shift register unit GOA10 and the $(9+16)^{th}$, i.e., twenty-fifth shift register unit are further cascade-connected to each other (not shown in the figure), the tenth shift register unit GOA10 may be configured to provide a carry signal to the twenty-fifth shift register unit, and the twenty-fifth shift register unit may be configured to provide a reset signal to the tenth shift register unit GOA10.

The eleventh shift register unit GOA11 and the twelfth shift register unit GOA12 are cascade-connected to each other, the eleventh shift register unit GOA11 may be configured to provide a carry signal to the twelfth shift register unit GOA12, and the twelfth shift register unit GOA12 may be configured to provide a reset signal to the eleventh shift register unit GOA11.

The twelfth shift register unit GOA12 and the $(11+16)^{th}$, i.e., twenty-seventh shift register unit are further cascade-connected to each other (not shown in the figure), the twelfth shift register unit GOA12 may be configured to provide a carry signal to the twenty-seventh shift register unit, and the twenty-seventh shift register unit may be configured to provide a reset signal to the twelfth shift register unit GOA12.

The thirteenth tenth shift register unit GOA13 and the fourteenth shift register unit GOA14 are cascade-connected to each other, the thirteenth tenth shift register unit GOA13 may be configured to provide a carry signal to the fourteenth shift register unit GOA14, and the fourteenth shift register unit GOA14 may be configured to provide a reset signal to the thirteenth tenth shift register unit GOA13.

The fourteenth shift register unit GOA14 and the $(13+16)^{th}$, i.e., twenty-ninth shift register unit are further cascade-connected to each other (not shown in the figure), the fourteenth shift register unit GOA14 may be configured to provide a carry signal to the twenty-ninth shift register unit, and the twenty-ninth shift register unit may be configured to provide a reset signal to the fourteenth shift register unit GOA14.

The fifteenth shift register unit GOA15 and the sixteenth shift register unit GOA16 are cascade-connected to each other, the fifteenth shift register unit GOA15 may be configured to provide a carry signal to the sixteenth shift register unit GOA16, and the sixteenth shift register unit GOA16 may be configured to provide a reset signal to the fifteenth shift register unit GOA15.

The sixteenth shift register unit GOA16 and the $(15+16)^{th}$, i.e., thirty-first shift register unit are further cascade-connected to each other (not shown in the figure), the sixteenth shift register unit GOA16 may be configured to provide a carry signal to the thirty-first shift register unit, and the thirty-first shift register unit may be configured to provide a reset signal to the sixteenth shift register unit GOA16.

In combination with the foregoing embodiments, it can be known that the cascading refers to that during scanning, a former shift register unit provides a carry signal for a latter shift register unit, and the latter shift register unit provides a reset signal for the former shift register unit. That is, the output terminal of the former shift register unit is connected to the input terminal of the latter shift register unit, and the output terminal of the latter shift register unit is connected to the reset terminal of the former shift register unit. In this way, when the potential of the output terminal of the former shift register unit is an effective potential, the latter shift register unit can be turned on. Therefore, the signal provided by the former shift register unit for the latter shift register unit is referred to as a carry signal. When the potential of the output terminal of the latter shift register unit is an effective potential, the reset terminal of the former shift register unit starts to reduce noise for the former shift register unit. Therefore, the signal provided by the latter shift register unit for the former shift register unit is referred to as a reset signal.

In this way, for the display substrate shown in FIG. 7, when the first shift register unit GOA1 provides the carry signal to the third shift register unit GOA3, the third shift register unit GOA3 provides the reset signal to the first shift register unit GOA1, and provides the carry signal to the seventeenth shift register unit GOA17 at the same time, and so on.

Similarly, for the display substrate shown in FIG. 8, when the first shift register unit GOA1 provides the carry signal to the second shift register unit GOA2, the second shift register unit GOA2 provides the reset signal to the first shift register unit GOA1, and provides the carry signal to the seventeenth shift register unit GOA17 at the same time, and so on.

In addition, relative to the display substrate shown in FIG. 7, for the display substrate shown in FIG. 8, since GOA1 and GOA2 are cascade-connected to each other, it can be determined that the potentials of the clock signals provided by every two adjacent clock signal terminals are complementary. Thus, it can be determined that the adjustable range of the pixel charging time is relatively large.

Figure 9:
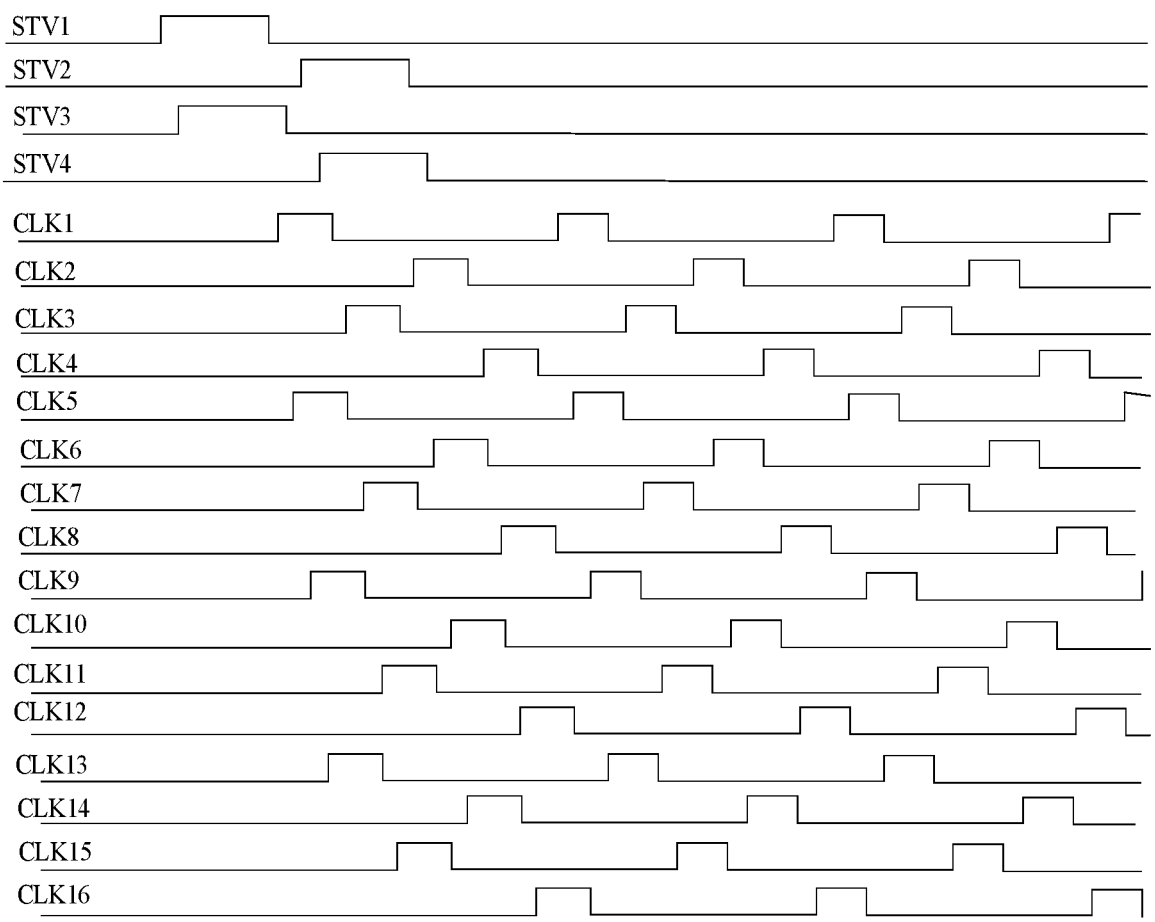
FIG. 9 is a diagram showing a signal timing sequence of a display substrate according to an embodiment of the present disclosure.
Figure 10:
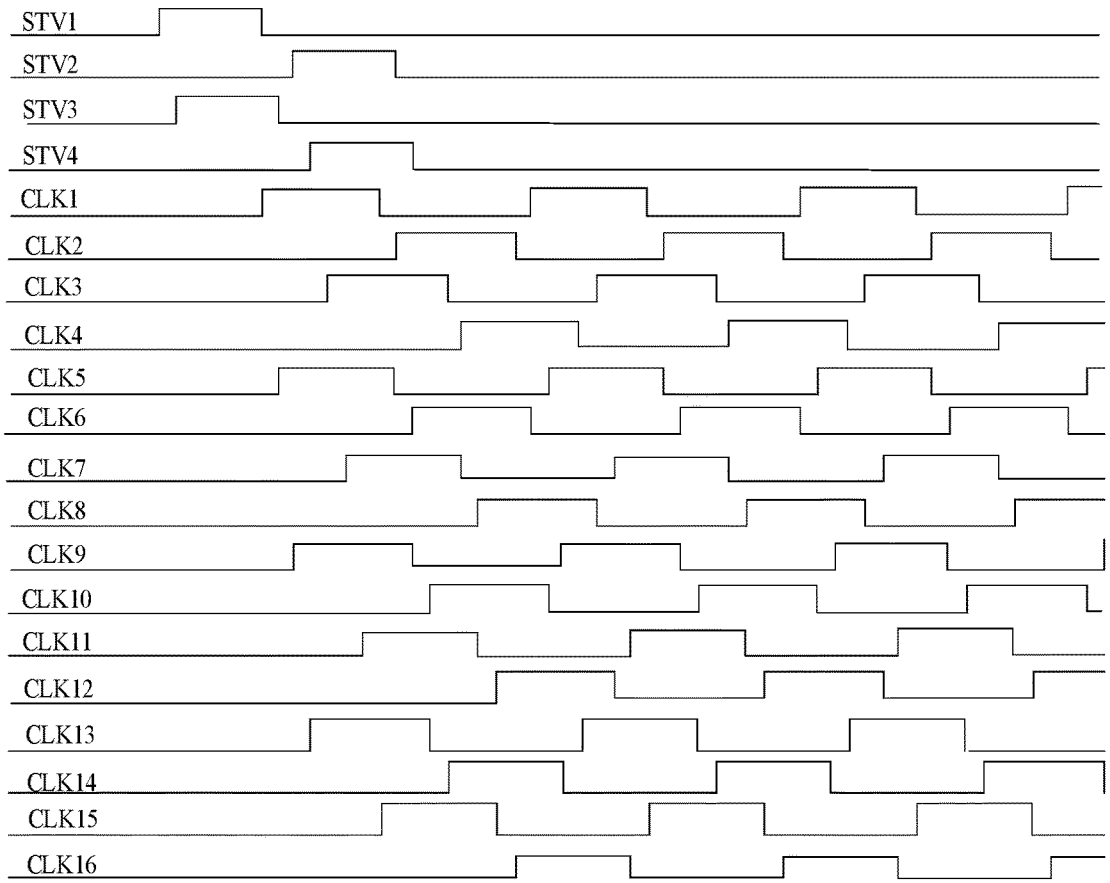
FIG. 10 is a diagram showing a signal timing sequence of another display substrate according to an embodiment of the present disclosure.

Based on the display substrate shown in FIG. 7, FIG. 9 shows a timing sequence diagram. Based on the display substrate shown in FIG. 8, FIG. 10 shows another timing sequence diagram. Referring to the timing sequence diagrams shown in FIG. 9 and FIG. 10, it can be known that the turn-on signal terminals STV1, STV3, STV2, and STV4 provide the turn-on signals in sequence, and CLK1, CLK5, CLK9, CLK13, CLK3, CLK7, CLK11, CLK15, CLK2, CLK6, CLK10, CLK14, CLK4, CLK8, CLK12, and CLK16 sequentially start to provide the clock signals at effective potentials.

Thus, for the display substrate shown in FIG. 7, in conjunction with the timing sequence diagram shown in FIG. 9, it can be known that when the turn-on signal terminal STV1 provides the turn-on signal at the effective potential, GOA1 can be turned on firstly until the clock signal provided by the clock signal terminal CLK1 connected to GOA1 becomes an effective potential, and GOA1 outputs a gate driving signal at an effective potential to the first gate line G1. Meanwhile, GOA1 also provides a carry signal to GOA3, and GOA3 is turned on. In order to prevent GOA3 from providing the gate driving signal at the effective potential to the connected third gate line G3 first, the clock signal provided by the clock signal terminal CLK3 connected to GOA3 remains at an ineffective potential, and so on. Optionally, the effective potential may be a high potential relative to the ineffective potential.

For the display substrate shown in FIG. 8, in conjunction with the timing sequence diagram shown in FIG. 10, it can be known that when the turn-on signal terminal STV1 provides a turn-on signal at an effective potential, GOA1 can be turned on at first until the clock signal provided by the clock signal terminal CLK1 connected to GOA1 becomes an effective potential, and GOA1 outputs the gate driving signal at the effective potential to the first gate line G1. Meanwhile, GOA1 also provides a carry signal to GOA2, and GOA2 is turned on. In order to prevent GOA2 from providing the gate driving signal at an effective potential to the connected second gate line G2 first, the clock signal provided by the clock signal terminal CLK2 remains at the ineffective potential, and so on.

In conjunction with the sequence of providing the effective potentials by CLK1 to CLK16, it can be known that whether the corresponding display substrate is driven in the timing sequence in FIG. 9 or FIG. 10, during scanning, the scanning sequence of the gate lines: G1→G5→G9→G13→G3→G7→G11→G15→G2→G6→G10→G14→G4→G8→G12→G16 can be implemented in one period. That is, every four shift register units are in one cycle, scanning of the gate lines is turned on in a skipping mode instead of a sequential mode. Based on the scanning sequence of the gate lines, the second data line D2, the third data line D3, and the fourth data line D4 in the display substrate shown in FIG. 3 can sequentially provide data signals to pixels of the following colors in one period:

D2: R→R→R→R→R→R→R→R→B→B→B→B→G→G→G→G;

D3: R→R→R→R→B→B→B→B→G→G→G→G→G→G→G→G;

D4: B→B→B→B→R→R→R→R→G→G→G→G→B→B→B→B.

Figure 11:
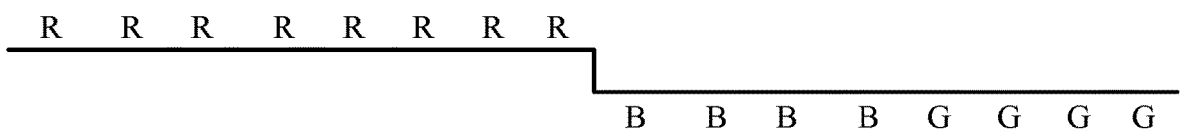
FIG. 11 is a diagram showing a wave form of a data signal provided by a data line according to an embodiment of the present disclosure.

By taking the display of a red picture as an example, FIG. 11 shows a timing sequence diagram of the data line D2 in one period. With reference to FIG. 11, it can be determined that when a pure-color picture is displayed, the potential of the data signal provided by the data line D2 is only reversed twice. This is also the case for other data lines.

However, if the scanning mode in the related art is adopted, that is, respective gate lines are controlled to be powered on sequentially, when the display substrate displays a pure-color picture, the second data line D2, the third data line D3 and the fourth data line D4 in the display substrate shown in FIG. 3 sequentially provide data signals to pixels of the following colors in one period:

D2: R→B→R→G→R→B→R→G→R→B→R→G→R→B→R→G;

D3: B→G→R→B→B→G→R→B→B→G→R→B→B→G→R→B;

D4: R→G→B→G→R→G→B→G→R→G→B→G→R→G→B→G.

Figure 12:
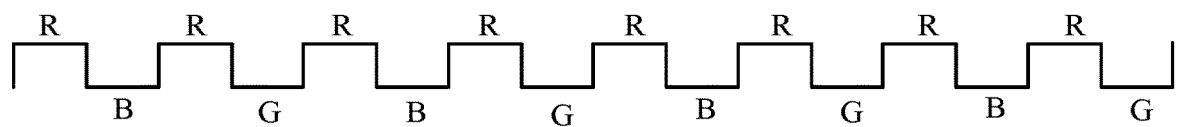
FIG. 12 is a diagram showing a wave form of a data signal provided by a data line in the related art.

Still taking the display of a red picture as an example, FIG. 12 shows a timing sequence diagram of the data line D2 in one period in the related art. With reference to FIG. 12, it can be determined that the potential of the data signal provided by the data line D2 is reversed for 16 times in one period. In addition, it can be determined in combination with the above sequence of providing the data signals that the potential of the data signal provided by the data line D3 is reversed for 8 times in one period, and the potential of the data signal provided by the data line D4 is reversed for 8 times in one period. The three data lines are reversed for a total of 32 times.

One reversal may refer to: reversal from an effective potential to an ineffective potential, or from an ineffective potential to an effective potential. Assuming that the ineffective potential is 0 volt (V) and the effective potential is 5V, then by comparing FIG. 11 with FIG. 12, it can be known that the potential on each data line in the related art needs to be switched between 0V and 5V for multiple times. However, the number of times of potential reversal of the data signal provided by the data line according to the embodiment of the present disclosure is reduced. Therefore, the frequency of potential switching between 0V and 5V is lower, and power consumption is reduced.

Moreover, if a conventional sequential cascading mode is adopted to implement the scanning sequence described in the embodiments of the present disclosure, GOA1 needs to be connected to the first gate line G1, GOA2 needs to be connected to the fifth gate line G5, GOA3 needs to be connected to the ninth gate line G9, and so on. This connection of lines is relatively complicated and difficult to implement. Therefore, in the embodiments of the present disclosure, the arrangement of the shift register units shown in FIG. 7 or FIG. 8 is adopted, which not only solves the problem that wiring is relatively difficult and not easy to implement, but also reliably implements the scanning shown in FIG. 11, thereby reducing the power consumption.

Furthermore, in conjunction with the finally determined scanning sequence "G1→G5→G9→G13→G3→G7→G11→G15→G2→G6→G10→G14→G4→G8→G12→G16", it can be known that in the display substrate shown in FIG. 7, it only takes 4 periods from power-on of G1 to power-on of the cascaded G3; while for the display substrate shown in FIG. 8, it takes 8 periods from power-on of G1 to power-on of the cascaded G2. Therefore, compared with the arrangement of FIG. 8, the power-on time period of G1 is shorter in FIG. 7, and thus the power consumption is also lower.

In summary, the embodiment of the present disclosure provides a display substrate. In the display substrate, in the plurality of pixels connected to each shift circuit, the pixels sharing the same data line are of the same color, and each shift circuit is connected to one turn-on signal terminal. Therefore, by flexible control over the turn-on signal provided by the turn-on signal terminal, each data line can continuously provide data signals to the pixels of the same color. Thus, when a pure-color picture is displayed, the number of times of potential reversal on each data line is less, which effectively reduces power consumption of the display device.

Figure 13:
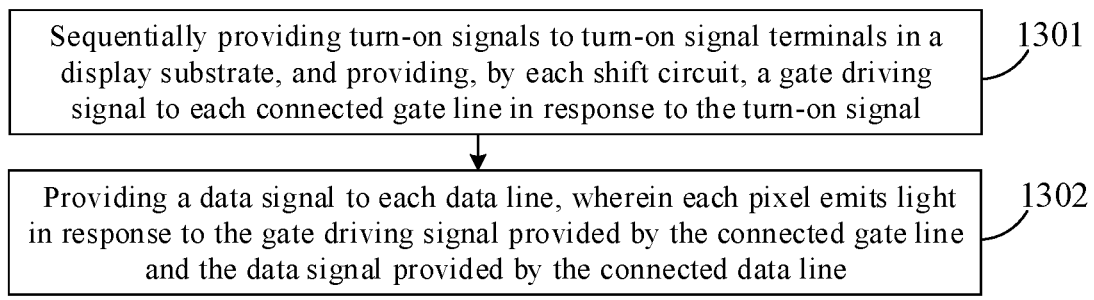
FIG. 13 is a flowchart of a method for driving a display substrate according to an embodiment of the present disclosure.

FIG. 13 is a flowchart of a method for driving a display substrate according to an embodiment of the present disclosure. The method may be applied to drive the display substrate as shown in any one of FIG. 1 to FIG. 8. As shown in FIG. 13, the method may include following steps.

In step 1301, turn-on signals are sequentially provided to the turn-on signal terminals in the display substrate, and each shift circuit provides a gate driving signal to each connected gate line in response to the turn-on signal.

In step 1302, a data signal is provided to each data line, and each pixel emits light in response to the gate driving signal provided by the connected gate line and the data signal provided by the connected data line.

Optionally, it is assumed that as shown in FIG. 7 and FIG. 8, the display substrate includes a total of four shift circuits, including a first shift circuit, a second shift circuit, a third shift circuit, and a fourth shift circuit. The first shift circuit and the second shift circuit are disposed on one side of the plurality of rows of pixels, and the third shift circuit and the fourth shift circuit are disposed on the other side of the plurality of rows of pixels. Correspondingly, referring to the timing sequence diagrams in FIG. 9 and FIG. 10, it can be known that sequentially providing the turn-on signal to the turn-on signal terminals in the display substrate may include: sequentially providing the turn-on signals to the two turn-on signal terminals connected to the first shift circuit and the second shift circuit first; and then sequentially providing the turn-on signals to the two turn-on signal terminals connected to the third shift circuit and the fourth shift circuit.

As an optional implementation, step 1301 is described below in conjunction with the display substrate shown in FIG. 7 and the timing sequence diagram corresponding to FIG. 9. Step 1301 may include the following steps performed in sequence.

In the first shift circuit, the shift register unit GOA1 connected to the first gate line G1 provides a gate driving signal to the first gate line G1 and provides a carry signal to the shift register unit GOA3 connected to the third gate line G3, in response to the turn-on signal provided by the first turn-on signal terminal STV1.

In the second shift circuit, the shift register unit GOA5 connected to the fifth gate line G5 provides a gate driving signal to the fifth gate line G5 and provides a carry signal to the shift register unit GOA7 connected to the seventh gate line G7, in response to the turn-on signal provided by the third turn-on signal terminal STV3.

In the first shift circuit, the shift register unit GOA9 connected to the ninth gate line G9 provides a gate driving signal to the ninth gate line G9 and provides a carry signal to the shift register unit GOA11 connected to the eleventh gate line G11, in response to the turn-on signal provided by the first turn-on signal terminal STV1.

In the second shift circuit, the shift register unit GOA13 connected to the thirteenth gate line G13 provides a gate driving signal to the thirteenth gate line G13 and provides a carry signal to the shift register unit GOA15 connected to the fifteenth gate line G15, in response to the turn-on signal provided by the third turn-on signal terminal STV3.

In the first shift circuit, the shift register unit GOA3 connected to the third gate line G3 provides a gate driving signal to the third gate line G3 in response to the received carry signal.

In the second shift circuit, the shift register unit GOA7 connected to the seventh gate line G7 provides a gate driving signal to the seventh gate line G7 in response to the received carry signal.

In the first shift circuit, the shift register unit GOA11 connected to the eleventh gate line G11 provides a gate driving signal to the eleventh gate line G11 in response to the received carry signal.

In the second shift circuit, the shift register unit GOA15 connected to the fifteenth gate line G15 provides a gate driving signal to the fifteenth gate line G15 in response to the received carry signal.

In the third shift circuit, the shift register unit GOA2 connected to the second gate line G2 provides a gate driving signal to the second gate line G2 and provides a carry signal to the shift register unit GOA4 connected to the fourth gate line G4, in response to the turn-on signal provided by the second turn-on signal terminal STV2.

In the fourth shift circuit, the shift register unit GOA6 connected to the sixth gate line G6 provides a gate driving signal to the sixth gate line G6 and provides a carry signal to the shift register unit GOA8 connected to the eighth gate line G8, in response to the turn-on signal provided by the fourth turn-on signal terminal STV4.

In the third shift circuit, the shift register unit GOA10 connected to the tenth gate line G10 provides a gate driving signal to the tenth gate line G10 and provides a carry signal to the shift register unit GOA12 connected to the twelfth gate line G12, in response to the turn-on signal provided by the second turn-on signal terminal STV2.

In the fourth shift circuit, the shift register unit GOA14 connected to the fourteenth gate line G14 provides a gate driving signal to the fourteenth gate line G14 and provides a carry signal to the shift register unit GOA16 connected to the sixteenth gate line G16, in response to the turn-on signal provided by the fourth turn-on signal terminal STV4.

In the third shift circuit, the shift register unit GOA4 connected to the fourth gate line G4 provides a gate driving signal to the fourth gate line G4 in response to the received carry signal.

In the fourth shift circuit, the shift register unit GOA8 connected to the eighth gate line G8 provides a gate driving signal to the eighth gate line G8 in response to the received carry signal.

In the third shift circuit, the shift register unit GOA12 connected to the twelfth gate line G12 provides a gate driving signal to the twelfth gate line G12 in response to the received carry signal.

In the fourth shift circuit, the shift register unit GOA16 connected to the sixteenth gate line G16 provides a gate driving signal to the sixteenth gate line G16 in response to the received carry signal.

As another optional implementation, step 1301 is described below in conjunction with the display substrate shown in FIG. 9 and the timing sequence diagram corresponding to FIG. 10. Step 1301 may include the following steps performed in sequence.

In the first shift circuit, the shift register unit GOA1 connected to the first gate line G1 provides a gate driving signal to the first gate line G1 and provides a carry signal to the shift register unit GOA2 connected to the second gate line G2, in response to the turn-on signal provided by the first turn-on signal terminal STV1.

In the second shift circuit, the shift register unit GOA5 connected to the fifth gate line G5 provides a gate driving signal to the fifth gate line G5 and provides a carry signal to the shift register unit GOA6 connected to the sixth gate line G6, in response to the turn-on signal provided by the third turn-on signal terminal STV3.

In the first shift circuit, the shift register unit GOA9 connected to the ninth gate line G9 provides a gate driving signal to the ninth gate line G9 and provides a carry signal to the shift register unit GOA10 connected to the tenth gate line G10, in response to the turn-on signal provided by the first turn-on signal terminal STV1.

In the second shift circuit, the shift register unit GOA13 connected to the thirteenth gate line G13 provides a gate driving signal to the thirteenth gate line G13 and provides a carry signal to the shift register unit GOA14 connected to the fourteenth gate line G14, in response to the turn-on signal provided by the third turn-on signal terminal STV3.

In the third shift circuit, the shift register unit GOA3 connected to the third gate line G3 provides a gate driving signal to the third gate line G3 and provides a carry signal to the shift register unit GOA4 connected to the fourth gate line G4, in response to the turn-on signal provided by the second turn-on signal terminal STV2.

In the fourth shift circuit, the shift register unit GOA7 connected to the seventh gate line G7 provides a gate driving signal to the seventh gate line G7 and provides a carry signal to the shift register unit GOA8 connected to the eighth gate line G8, in response to the turn-on signal provided by the fourth turn-on signal terminal STV4.

In the third shift circuit, the shift register unit GOA11 connected to the eleventh gate line G11 provides a gate driving signal to the eleventh gate line G11 and provides a carry signal to the shift register unit GOA12 connected to the twelfth gate line G12, in response to the turn-on signal provided by the second turn-on signal terminal STV2.

In the fourth shift circuit, the shift register unit GOA15 connected to the fifteenth gate line G15 provides a gate driving signal to the fifteenth gate line G15 and provides a carry signal to the shift register unit GOA16 connected to the sixteenth gate line G16, in response to the turn-on signal provided by the fourth turn-on signal terminal STV4.

In the first shift circuit, the shift register unit GOA2 connected to the second gate line G2 provides a gate driving signal to the second gate line G2 in response to the received carry signal.

In the second shift circuit, the shift register unit GOA6 connected to the sixth gate line G6 provides a gate driving signal to the sixth gate line G6 in response to the received carry signal.

In the first shift circuit, the shift register unit GOA10 connected to the tenth gate line G10 provides a gate driving signal to the tenth gate line G10 in response to the received carry signal.

In the second shift circuit, the shift register unit GOA14 connected to the fourteenth gate line G14 provides a gate driving signal to the fourteenth gate line G14 in response to the received carry signal.

In the third shift circuit, the shift register unit GOA4 connected to the fourth gate line G4 provides a gate driving signal to the fourth gate line G4 in response to the received carry signal.

In the fourth shift circuit, the shift register unit GOA8 connected to the eighth gate line G8 provides a gate driving signal to the eighth gate line G8 in response to the received carry signal.

In the third shift circuit, the shift register unit GOA12 connected to the twelfth gate line G12 provides a gate driving signal to the twelfth gate line G12 in response to the received carry signal.

In the fourth shift circuit, the shift register unit GOA16 connected to the sixteenth gate line G16 provides a gate driving signal to the sixteenth gate line G16 in response to the received carry signal.

In conjunction with the above descriptions of step 1301, it can be known that either the display substrate shown in FIG. 7 (that is the timing sequence shown in FIG. 9) or the display substrate shown in FIG. 8 (that is the timing sequence shown in FIG. 10) can achieve the scanning sequence of the gate lines: G1→G5→G9→G13→G3→G7→G11→G15→G2→G6→G10→G14→G4→G8→G12→G16 in one period.

In summary, according to the method for driving a display substrate provided in the embodiment of the present disclosure, each shift circuit can provide a gate driving signal to each connected gate line in response to the turn-on signal. Additionally, in the display substrate, in the plurality of pixels connected to each shift circuit, the pixels sharing the same data line are of the same color, and each shift circuit is connected to one turn-on signal terminal. Therefore, by flexible control over the turn-on signals provided by the turn-on signal terminals, each data line can continuously provide the data signals to the pixels of the same color. Thus, when a pure-color picture is displayed, the number of times of potential reversal on each data line is less, which effectively reduces power consumption of the display device.

Figure 14:
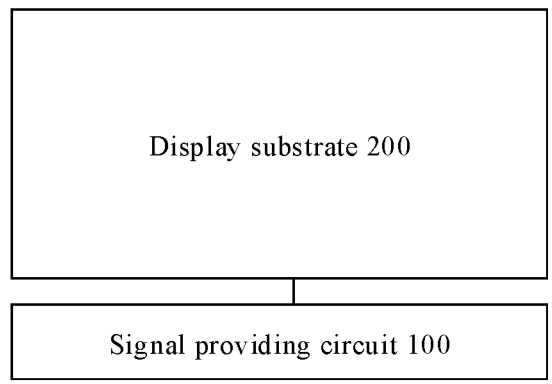
FIG. 14 is a schematic structural diagram of a display device according to an embodiment of the present disclosure.

FIG. 14 is a schematic structural diagram of a display device according to an embodiment of the present disclosure. As shown in FIG. 14, the display device may include a signal providing circuit 100 and the display substrate 200 shown in any one of FIG. 1 to FIG. 8. The signal providing circuit 100 may be connected to the turn-on signal terminal in the display substrate 200 and may be configured to provide a turn-on signal to the turn-on signal terminal.

Optionally, the display device may be any product or component having a display function, such as an organic light-emitting diode (OLED) display device, a mobile phone, a tablet computer, a television, a display, a notebook computer, a navigator, or the like.

The above descriptions are merely optional embodiments of the present disclosure, and are not intended to limit the present disclosure. Any modifications, equivalent substitutions or improvements that are made within the spirit and principle of the present disclosure should be included in the protection scope of the present disclosure.

What is claimed is:

1. A display substrate, comprising:
    a base substrate;
    a plurality of gate lines, a plurality of data lines, and a plurality of rows of pixels arranged in an array on the base substrate, wherein each row of the pixels comprises a plurality of pixel groups, wherein each of the pixel groups comprises two adjacent pixels of different colors, the two adjacent pixels being connected to different gate lines and a same data line; and
    four shift circuits disposed on the base substrate, wherein each of the shift circuits is connected to one turn-on signal terminal and at least two gate lines of the plurality of gate lines, and each of the shift circuits is configured to provide a gate driving signal to each gate line connected thereto in response to a turn-on signal provided by the turn-on signal terminal,
    wherein in a plurality of pixels connected to each of the shift circuits, colors of pixels connected to a same data line are the same; and, the four shift circuits are configured to sequentially provide the gate driving signal for each row of four rows of pixels in each period, any two rows of the four rows of pixels are not adjacent to each other, and pixels connected to the same data line in the four rows of pixels have the same color, so that a potential of a data signal provided by each of the data lines remains unreversed in each period.

2. The display substrate according to claim 1, wherein each of the shift circuits comprises at least four shift register units, wherein each of the shift register units is connected to one gate line, and the at least four shift register units in each of the shift circuits are capable of being divided into two shift register groups,
    wherein each of the shift register groups comprises a plurality of cascaded shift register units, and one shift register unit in each of the shift register groups is connected to the turn-on signal terminal.

3. The display substrate according to claim 2, wherein each of the shift register groups comprises a plurality of shift register sub-groups, wherein each shift register sub-group comprises two adjacent cascaded shift register units, one of which is connected to an $i^{th}$ gate line and the other of which is connected to an $(i+s)^{th}$ gate line, wherein the $i^{th}$ gate line and the $(i+s)^{th}$ gate line are adjacent to each other, i being a positive integer and s being 1 or 2.

4. The display substrate according to claim 3, wherein a number d of clock signal terminals connected to the shift circuits in the display substrate is an integral multiple of 4.

5. The display substrate according to claim 4, wherein the number d of the clock signal terminals connected to the shift circuits in the display substrate is 16.

6. The display substrate according to claim 5, wherein the shift circuits comprises a first shift circuit, a second shift circuit, a third shift circuit, and a fourth shift circuit, wherein the first shift circuit and the second shift circuit are disposed at one side of the plurality of rows of pixels, and the third shift circuit and the fourth shift circuit are disposed at the other side of the plurality of rows of pixels.

7. The display substrate according to claim 6, wherein a $(2n-1)^{th}$ shift register sub-group at the one side of the plurality of rows of pixels belongs to the first shift circuit, and a $2n^{th}$ shift register sub-group at the one side of the plurality of rows of pixels belongs to the second shift circuit, n being a positive integer; and
    a $(2n-1)^{th}$ shift register sub-group at the other side of the plurality of rows of pixels belongs to the third shift circuit, and a $2n^{th}$ shift register sub-group at the other side of the plurality of rows of pixels belongs to the fourth shift circuit.

8. The display substrate according to claim 7, wherein a $(4n-3)^{th}$ shift register sub-group at the one side of the plurality of rows of pixels belongs to one shift register group in the first shift circuit, and a $(4n-1)^{th}$ shift register sub-group at the one side of the plurality of rows of pixels belongs to the other shift register group in the first shift circuit;
    a $(4n-2)^{th}$ shift register sub-group at the one side of the plurality of rows of pixels belongs to one shift register group in the second shift circuit, and a $4n^{th}$ shift register sub-group at the one side of the plurality of rows of pixels belongs to the other shift register group in the second shift circuit;
    a $(4n-3)^{th}$ shift register sub-group at the other side of the plurality of rows of pixels belongs to one shift register group in the third shift circuit, and a $(4n-1)^{th}$ shift register sub-group at the other side of the plurality of rows of pixels belongs to the other shift register group in the third shift circuit; and
    a $(4n-2)^{th}$ shift register sub-group at the other side of the plurality of rows of pixels belongs to one shift register group in the fourth shift circuit, and a $4n^{th}$ shift register sub-group at the other side of the plurality of rows of pixels belongs to the other shift register group in the fourth shift circuit.

9. The display substrate according to claim 5, wherein s is 2, and the shift register unit connected to the $i^{th}$ gate line is an $i^{th}$ shift register unit; wherein
    a first shift register unit and a third shift register unit are cascade-connected to each other, wherein the first shift register unit is configured to provide a carry signal to the third shift register unit, and the third shift register unit is configured to provide a reset signal to the first shift register unit;
    the third shift register unit and a $(1+d)^{th}$ shift register unit are further cascade-connected to each other, wherein the third shift register unit is configured to provide a carry signal to the $(1+d)^{th}$ shift register unit, and the $(1+d)^{th}$ shift register unit is configured to provide a reset signal to the third shift register unit;
    a fifth shift register unit and a seventh shift register unit are cascade-connected to each other, wherein the fifth shift register unit is configured to provide a carry signal to the seventh shift register unit, and the seventh shift register unit is configured to provide a reset signal to the fifth shift register unit;
    the seventh shift register unit and a $(5+d)^{th}$ shift register unit are further cascade-connected to each other, wherein the seventh shift register unit is configured to provide a carry signal to the $(5+d)^{th}$ shift register unit, and the $(5+d)^{th}$ shift register unit is configured to provide a reset signal to the seventh shift register unit;

a ninth shift register unit and an eleventh shift register unit are cascade-connected to each other, wherein the ninth shift register unit is configured to provide a carry signal to the eleventh shift register unit, and the eleventh shift register unit is configured to provide a reset signal to the ninth shift register unit;

the eleventh shift register unit and a $(9+d)^{th}$ shift register unit are further cascade-connected to each other, wherein the eleventh shift register unit is configured to provide a carry signal to the $(9+d)^{th}$ shift register unit, and the $(9+d)^{th}$ shift register unit is configured to provide a reset signal to the eleventh shift register unit;

a thirteenth shift register unit and a fifteenth shift register unit are cascade-connected to each other, wherein the thirteenth shift register unit is configured to provide a carry signal to the fifteenth shift register unit, and the fifteenth shift register unit is configured to provide a reset signal to the thirteenth shift register unit;

the fifteenth shift register unit and a $(13+d)^{th}$ shift register unit are further cascade-connected to each other, wherein the fifteenth shift register unit is configured to provide a carry signal to the $(13+d)^{th}$ shift register unit, and the $(13+d)^{th}$ shift register unit is configured to provide a reset signal to the fifteenth shift register unit;

a second shift register unit and a fourth shift register unit are cascade-connected to each other, wherein the second shift register unit is configured to provide a carry signal to the fourth shift register unit, and the fourth shift register unit is configured to provide a reset signal to the second shift register unit;

the fourth shift register unit and a $(2+d)^{th}$ shift register unit are further cascade-connected to each other, wherein the fourth shift register unit is configured to provide a carry signal to the $(2+d)^{th}$ shift register unit, and the $(2+d)^{th}$ shift register unit is configured to provide a reset signal to the fourth shift register unit;

a sixth shift register unit and an eighth shift register unit are cascade-connected to each other, wherein the sixth shift register unit is configured to provide a carry signal to the eighth shift register unit, and the eighth shift register unit is configured to provide a reset signal to the sixth shift register unit;

the eighth shift register unit and a $(6+d)^{th}$ shift register unit are further cascade-connected to each other, wherein the eighth shift register unit is configured to provide a carry signal to the $(6+d)^{th}$ shift register unit, and the $(6+d)^{th}$ shift register unit is configured to provide a reset signal to the eighth shift register unit;

a tenth shift register unit and a twelfth shift register unit are cascade-connected to each other, wherein the tenth shift register unit is configured to provide a carry signal to the twelfth shift register unit, and the twelfth shift register unit is configured to provide a reset signal to the tenth shift register unit;

the twelfth shift register unit and a $(10+d)^{th}$ shift register unit are further cascade-connected to each other, wherein the twelfth shift register unit is configured to provide a carry signal to the $(10+d)^{th}$ shift register unit, and the $(10+d)^{th}$ shift register unit is configured to provide a reset signal to the twelfth shift register unit;

a fourteenth shift register unit and a sixteenth shift register unit are cascade-connected to each other, wherein the fourteenth shift register unit is configured to provide a carry signal to the sixteenth shift register unit, and the sixteenth shift register unit is configured to provide a reset signal to the fourteenth shift register unit; and the sixteenth shift register unit and a $(14+d)^{th}$ shift register unit are further cascade-connected to each other, wherein the sixteenth shift register unit is configured to provide a carry signal to the $(14+d)^{th}$ shift register unit, and the $(14+d)^{th}$ shift register unit is configured to provide a reset signal to the sixteenth shift register unit.

10. The display substrate according to claim 5, wherein s is 1, and the shift register unit connected to the $i^{th}$ gate line is an $i^{th}$ shift register unit;

a first shift register unit and a second shift register unit are cascade-connected to each other, wherein the first shift register unit is configured to provide a carry signal to the second shift register unit, and the second shift register unit is configured to provide a reset signal to the first shift register unit;

the second shift register unit and a $(1+d)^{th}$ shift register unit are further cascade-connected to each other, wherein the second shift register unit is configured to provide a carry signal to the $(1+d)^{th}$ shift register unit, and the $(1+d)^{th}$ shift register unit is configured to provide a reset signal to the second shift register unit;

a third shift register unit and a fourth shift register unit cascade-connected to each other, wherein the third shift register unit is configured to provide a carry signal to the fourth shift register unit, and the fourth shift register unit is configured to provide a reset signal to the third shift register unit;

the fourth shift register unit and a $(3+d)^{th}$ shift register unit are further cascade-connected to each other, wherein the fourth shift register unit is configured to provide a carry signal to the $(3+d)^{th}$ shift register unit, and the $(3+d)^{th}$ shift register unit is configured to provide a reset signal to the fourth shift register unit;

a fifth shift register unit and a sixth shift register unit are cascade-connected to each other, wherein the fifth shift register unit is configured to provide a carry signal to the sixth shift register unit, and the sixth shift register unit is configured to provide a reset signal to the fifth shift register unit;

the sixth shift register unit and a $(5+d)^{th}$ shift register unit are further cascade-connected to each other, wherein the sixth shift register unit is configured to provide a carry signal to the $(5+d)^{th}$ shift register unit, and the $(5+d)^{th}$ shift register unit is configured to provide a reset signal to the sixth shift register unit;

a seventh shift register unit and an eighth shift register unit are cascade-connected to each other, wherein the seventh shift register unit is configured to provide a carry signal to the eighth shift register unit, and the eighth shift register unit is configured to provide a reset signal to the seventh shift register unit;

the eighth shift register unit and a $(7+d)^{th}$ shift register unit are further cascade-connected to each other, wherein the eighth shift register unit is configured to provide a carry signal to the $(7+d)^{th}$ shift register unit, and the $(7+d)^{th}$ shift register unit is configured to provide a reset signal to the eighth shift register unit;

a ninth shift register unit and a tenth shift register unit are cascade-connected to each other, wherein the ninth shift register unit is configured to provide a carry signal to the tenth shift register unit, and the tenth shift register unit is configured to provide a reset signal to the ninth shift register unit;

the tenth shift register unit and a $(9+d)^{th}$ shift register unit are further cascade-connected to each other, wherein the tenth shift register unit is configured to provide a carry signal to the $(9+d)^{th}$ shift register unit, and the $(9+d)^{th}$ shift register unit is configured to provide a reset signal to the tenth shift register unit;

an eleventh shift register unit and a twelfth shift register unit are cascade-connected to each other, wherein the eleventh shift register unit is configured to provide a carry signal to the twelfth shift register unit, and the twelfth shift register unit is configured to provide a reset signal to the eleventh shift register unit;

the twelfth shift register unit and a $(11+d)^{th}$ shift register unit are further cascade-connected to each other, wherein the twelfth shift register unit is configured to provide a carry signal to the $(11+d)^{th}$ shift register unit, and the $(11+d)^{th}$ shift register unit is configured to provide a reset signal to the twelfth shift register unit;

a thirteenth shift register unit and a fourteenth shift register unit are cascade-connected to each other, wherein the thirteenth shift register unit is configured to provide a carry signal to the fourteenth shift register unit, and the fourteenth shift register unit is configured to provide a reset signal to the thirteenth shift register unit;

the fourteenth shift register unit and a $(13+d)^{th}$ shift register unit are further cascade-connected to each other, wherein the fourteenth shift register unit is configured to provide a carry signal to the $(13+d)^{th}$ shift register unit, and the $(13+d)^{th}$ shift register unit is configured to provide a reset signal to the fourteenth shift register unit;

a fifteenth shift register unit and a sixteenth shift register unit are cascade-connected to each other, wherein the fifteenth shift register unit is configured to provide a carry signal to the sixteenth shift register unit, and the sixteenth shift register unit is configured to provide a reset signal to the fifteenth shift register unit; and the sixteenth shift register unit and a $(15+d)^{th}$ shift register unit are further cascade-connected to each other, wherein the sixteenth shift register unit is configured to provide a carry signal to the $(15+d)^{th}$ shift register unit, and the $(15+d)^{th}$ shift register unit is configured to provide a reset signal to the sixteenth shift register unit.

11. The display substrate according to claim 5, the display substrate further comprises a first turn-on signal terminal, a second turn-on signal terminal, a third turn-on signal terminal, and a fourth turn-on signal terminal; wherein in the first shift circuit, a first shift register unit in a first shift register sub-group and a first shift register unit in a second shift register sub-group are connected to the first turn-on signal terminal;

in the second shift circuit, a first shift register unit in a first shift register sub-group and a first shift register unit in a second shift register sub-group are connected to the third turn-on signal terminal;

in the third shift circuit, a first shift register unit in a first shift register sub-group and a first shift register unit in a second shift register sub-group are connected to the second turn-on signal terminal; and in the fourth shift circuit, a first shift register unit in a first shift register sub-group and a first shift register unit in a second shift register sub-group are connected to the fourth turn-on signal terminal.

12. The display substrate according to claim 1, wherein the pixels disposed in a same row are sequentially arranged in a first color, a second color, and a third color, and the pixels disposed in a same column are of a same color.

13. The display substrate according to claim 12, wherein in two adjacent pixel groups connected to a same data line, none of the pixels is disposed in a same column.

14. The display substrate according to claim 13, wherein each data line comprises: a plurality of data line segments and a plurality of connecting line segments; wherein two ends of each connecting line segment are respectively connected to two adjacent data line segments; and each of the pixel groups corresponds to one data line segment, and any two adjacent data line segments are respectively disposed between two pixels in the pixel groups in different columns and adjacent rows.

15. The display substrate according to claim 12, wherein in the two adjacent pixel groups connected to the same data line, at least two pixels are disposed in a same column.

16. A method for driving a display substrate, wherein the method is applied to drive a display substrate comprising: a base substrate; a plurality of gate lines, a plurality of data lines, and a plurality of rows of pixels arranged in an array on the base substrate, wherein each row of the pixels comprises a plurality of pixel groups, wherein each of the pixel groups comprises two adjacent pixels of different colors, the two adjacent pixels being connected to different gate lines and a same data line; and four shift circuits disposed on the base substrate, wherein each of the shift circuits is connected to one turn-on signal terminal and at least two gate lines of the plurality of gate lines, and each of the shift circuits is configured to provide a gate driving signal to each gate line connected thereto in response to a turn-on signal provided by the turn-on signal terminal, wherein in a plurality of pixels connected to each of the shift circuits, colors of pixels connected to a same data line are the same, the four shift circuits are configured to sequentially provide the gate driving signal for each row of four rows of pixels in each period, any two rows of the four rows of pixels are not adjacent to each other, and pixels connected to the same data line in the four rows of pixels have the same color, so that a potential of a data signal provided by each of the data lines remains unreversed in each period; and the method comprising:

sequentially providing turn-on signals to turn-on signal terminals in the display substrate, and providing, by each shift circuit, a gate driving signal to each connected gate line in response to the turn-on signal; and providing a data signal to each data line in the display substrate, wherein each pixel in the display substrate emits light in response to the gate driving signal provided by the connected gate line and the data signal provided by the connected data line.

17. The method according to claim 16, wherein the display substrate comprises a first shift circuit, a second shift circuit, a third shift circuit, a fourth shift circuit, a first turn-on signal terminal, a second turn-on signal terminal, a third turn-on signal terminal, and a fourth turn-on signal terminal; wherein the first turn-on signal terminal is connected to the first shift circuit, the third turn-on signal terminal is connected to the second shift circuit, the second turn-on signal terminal is connected to the third shift circuit, and the fourth turn-on signal terminal is connected to the fourth shift circuit; and sequentially providing the turn-on signals to the turn-on signal terminals in the display substrate comprises:
sequentially providing the turn-on signals to the first turn-on signal terminal, the third turn-on signal terminal, the second turn-on signal terminal, and the fourth turn-on signal terminal.

18. The method according to claim 17, wherein each of the shift circuits comprises at least four shift register units, wherein each of the shift register units is connected to one gate line, and the at least four shift register units in each of the shift circuits are capable of being divided into two shift register groups; wherein each of the shift register groups comprises a plurality of cascaded shift register units, one shift register unit in each of the shift register groups being connected to the turn-on signal terminal, and each of the shift register groups comprises a plurality of shift register sub-groups, wherein each of the shift register sub-groups comprises two adjacent cascaded shift register units, one of which is connected to an $i^{th}$ gate line and the other of which is connected to an $(i+2)^{th}$ gate line, wherein the $i^{th}$ gate line and the $(i+2)^{th}$ gate line are adjacent to each other, i being a positive integer; and providing, by each shift circuit, the gate driving signal to each connected gate line in response to the turn-on signal comprises the following steps in sequence:

in the first shift circuit, providing, by a shift register unit connected to a first gate line, a gate driving signal to the first gate line and a carry signal to a shift register unit connected to a third gate line, in response to a turn-on signal provided by the first turn-on signal terminal;

in the second shift circuit, providing, by a shift register unit connected to a fifth gate line, a gate driving signal to the fifth gate line and a carry signal to a shift register unit connected to a seventh gate line, in response to a turn-on signal provided by the third turn-on signal terminal;

in the first shift circuit, providing, by a shift register unit connected to a ninth gate line, a gate driving signal to the ninth gate line and a carry signal to a shift register unit connected to an eleventh gate line, in response to the turn-on signal provided by the first turn-on signal terminal;

in the second shift circuit, providing, by a shift register unit connected to a thirteenth gate line, a gate driving signal to the thirteenth gate line and a carry signal to a shift register unit connected to a fifteenth gate line, in response to the turn-on signal provided by the third turn-on signal terminal;

in the first shift circuit, providing, by the shift register unit connected to the third gate line, a gate driving signal to the third gate line in response to the received carry signal;

in the second shift circuit, providing, by the shift register unit connected to the seventh gate line, a gate driving signal to the seventh gate line in response to the received carry signal;

in the first shift circuit, providing, by the shift register unit connected to the eleventh gate line, a gate driving signal to the eleventh gate line in response to the received carry signal;

in the second shift circuit, providing, by the shift register unit connected to the fifteenth gate line, a gate driving signal to the fifteenth gate line in response to the received carry signal;

in the third shift circuit, providing, by a shift register unit connected to a second gate line, a gate driving signal to the second gate line and a carry signal to a shift register unit connected to a fourth gate line, in response to a turn-on signal provided by the second turn-on signal terminal;

in the fourth shift circuit, providing, by a shift register unit connected to a sixth gate line, a gate driving signal to the sixth gate line and a carry signal to a shift register unit connected to an eighth gate line, in response to a turn-on signal provided by the fourth turn-on signal terminal;

in the third shift circuit, providing, by a shift register unit connected to a tenth gate line, a gate driving signal to the tenth gate line and a carry signal to a shift register unit connected to a twelfth gate line, in response to the turn-on signal provided by the second turn-on signal terminal;

in the fourth shift circuit, providing, by a shift register unit connected to an fourteenth gate line, a gate driving signal to the fourteenth gate line and a carry signal to a shift register unit connected to an sixteenth gate line, in response to the turn-on signal provided by the fourth turn-on signal terminal;

in the third shift circuit, providing, by the shift register unit connected to the fourth gate line, a gate driving signal to the fourth gate line in response to the received carry signal;

in the fourth shift circuit, providing, by the shift register unit connected to the eighth gate line, a gate driving signal to the eighth gate line in response to the received carry signal;

in the third shift circuit, providing, by the shift register unit connected to the twelfth gate line, a gate driving signal to the twelfth gate line in response to the received carry signal; and in the fourth shift circuit, providing, by the shift register unit connected to the sixteenth gate line, a gate driving signal to the sixteenth gate line in response to the received carry signal.

19. The method according to claim 17, wherein each of the shift circuits comprises at least four shift register units, wherein each of the shift register units is connected to a gate line, and the at least four shift register units in each of the shift circuits are capable of being divided into two shift register groups; wherein each of the shift register groups comprises a plurality of cascaded shift register units, one shift register unit in each of the shift register groups being connected to the turn-on signal terminal, and each of the shift register groups comprises a plurality of shift register sub-groups, each of the shift register sub-group comprises two adjacent cascaded shift register units, one of which is connected to an $i^{th}$ gate line and the other of which is connected to an $(i+1)^{th}$ gate line, wherein the $i^{th}$ gate line and the $(i+1)^{th}$ gate line are adjacent to each other, i being a positive integer; and providing, by each shift circuit, the gate driving signal to each connected gate line in response to the turn-on signal comprises the following steps in sequence:

in the first shift circuit, providing, by a shift register unit connected to a first gate line, a gate driving signal to the first gate line and a carry signal to a shift register unit connected to a second gate line, in response to a turn-on signal provided by the first turn-on signal terminal;

in the second shift circuit, providing, by a shift register unit connected to a fifth gate line, a gate driving signal to the fifth gate line and a carry signal to the shift register unit connected to a sixth gate line, in response to a turn-on signal provided by the third turn-on signal terminal;

in the first shift circuit, providing, by a shift register unit connected to a ninth gate line, a gate driving signal to the ninth gate line and a carry signal to a shift register unit connected to a tenth gate line, in response to the turn-on signal provided by the first turn-on signal terminal;

in the second shift circuit, providing, by a shift register unit connected to a thirteenth gate line, a gate driving signal to the thirteenth gate line and a carry signal to a shift register unit connected to a fourteenth gate line, in response to the turn-on signal provided by the third turn-on signal terminal;

in the third shift circuit, providing, by a shift register unit connected to a third gate line, a gate driving signal to the third gate line and a carry signal to a shift register unit connected to a fourth gate line, in response to a turn-on signal provided by the second turn-on signal terminal;

in the fourth shift circuit, providing, by a shift register unit connected to a seventh gate line, a gate driving signal to the seventh gate line and a carry signal to a shift register unit connected to an eighth gate line, in response to a turn-on signal provided by the fourth turn-on signal terminal;

in the third shift circuit, providing, by a shift register unit connected to an eleventh gate line, a gate driving signal to the eleventh gate line and a carry signal to a shift register unit connected to a twelfth gate line, in response to the turn-on signal provided by the second turn-on signal terminal;

in the fourth shift circuit, providing, by a shift register unit connected to a fifteenth gate line, a gate driving signal to the fifteenth gate line and a carry signal to a shift register unit connected to a sixteenth gate line, in response to the turn-on signal provided by the fourth turn-on signal terminal;

in the first shift circuit, providing, by the shift register unit connected to the second gate line, a gate driving signal to the second gate line in response to the received carry signal;

in the second shift circuit, providing, by the shift register unit connected to the sixth gate line, a gate driving signal to the sixth gate line in response to the received carry signal;

in the first shift circuit, providing, by the shift register unit connected to the tenth gate line, a gate driving signal to the tenth gate line in response to the received carry signal;

in the second shift circuit, providing, by the shift register unit connected to the fourteenth gate line, a gate driving signal to the fourteenth gate line in response to the received carry signal;

in the third shift circuit, providing, by the shift register unit connected to the fourth gate line, a gate driving signal to the fourth gate line in response to the received carry signal;

in the fourth shift circuit, providing, by the shift register unit connected to the eighth gate line, a gate driving signal to the eighth gate line in response to the received carry signal;

in the third shift circuit, providing, by the shift register unit connected to the twelfth gate line, a gate driving signal to the twelfth gate line in response to the received carry signal; and in the fourth shift circuit, providing, by the shift register unit connected to the sixteenth gate line, a gate driving signal to the sixteenth gate line in response to the received carry signal.

20. A display device, comprising a signal providing circuit and a display substrate comprising: a base substrate; a plurality of gate lines, a plurality of data lines, and a plurality of rows of pixels arranged in an array on the base substrate, wherein each row of the pixels comprises a plurality of pixel groups, wherein each of the pixel groups comprises two adjacent pixels of different colors, the two adjacent pixels being connected to different gate lines and a same data line; and four shift circuits disposed on the base substrate, wherein each of the shift circuits is connected to one turn-on signal terminal and at least two gate lines of the plurality of gate lines, and each of the shift circuits is configured to provide a gate driving signal to each gate line connected thereto in response to a turn-on signal provided by the turn-on signal terminal, wherein in a plurality of pixels connected to each of the shift circuits, colors of pixels connected to a same data line are the same, the four shift circuits are configured to sequentially provide the gate driving signal for each row of four rows of pixels in each period, any two rows of the four rows of pixels are not adjacent to each other, and pixels connected to the same data line in the four rows of pixels have the same color, so that a potential of a data signal provided by each of the data lines remains unreversed in each period; and wherein the signal providing circuit is connected to a turn-on signal terminal in the display substrate and is configured to provide a turn-on signal to the turn-on signal terminal.

* * * * *